(12) United States Patent
Kobayashi

(10) Patent No.: US 7,824,265 B2
(45) Date of Patent: Nov. 2, 2010

(54) VIRTUAL CAMERA CONTROL METHOD IN THREE-DIMENSIONAL VIDEO GAME

(75) Inventor: Kazumi Kobayashi, Kanagawa (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 2022 days.

(21) Appl. No.: 10/759,133

(22) Filed: Jan. 20, 2004

(65) Prior Publication Data

US 2004/0176164 A1 Sep. 9, 2004

(30) Foreign Application Priority Data

Mar. 5, 2003 (JP) .......................... P2003-058136

(51) Int. Cl.
*A63F 13/00* (2006.01)

(52) U.S. Cl. .............. 463/33; 463/32; 463/43

(58) Field of Classification Search .................. 463/37, 463/30, 32–33, 40–43; 345/419, 629, 472; 715/810; 348/159
See application file for complete search history.

(56) References Cited

U.S. PATENT DOCUMENTS

| | | | |
|---|---|---|---|
| 6,217,446 B1* | 4/2001 | Sanbongi et al. ............... | 463/7 |
| 6,322,448 B1* | 11/2001 | Kaku et al. .................... | 463/32 |
| 6,556,204 B1* | 4/2003 | Itai et al. ..................... | 345/472 |
| 6,835,136 B2* | 12/2004 | Kitao ........................... | 463/33 |
| 7,198,568 B2* | 4/2007 | Takahashi et al. .............. | 463/1 |
| 2001/0024972 A1* | 9/2001 | Kitao ........................... | 463/33 |
| 2002/0142834 A1* | 10/2002 | Sobue .......................... | 463/30 |
| 2003/0096648 A1* | 5/2003 | Ohno et al. .................... | 463/32 |

FOREIGN PATENT DOCUMENTS

| | | |
|---|---|---|
| EP | 528422 | 2/1993 |
| EP | 1245255 | 10/2002 |
| JP | 6-274598 | 9/1994 |
| JP | 7-85312 | 3/1995 |
| JP | 10-113467 | 5/1998 |
| JP | 2001-162040 | 6/2001 |
| JP | 2001-269482 | 10/2001 |
| JP | 2003-44868 | 2/2003 |

OTHER PUBLICATIONS

English Language Abstract of JP 2001-269482.
English Language Abstract of JP 7-85312.
English Language Abstract of JP 6-274598.
English Language Abstract of JP 2003-44868.
English Language Abstract of JP 10-113467.
English Language Abstract of JP2001-162040.

* cited by examiner

*Primary Examiner*—Peter DungBa Vo
*Assistant Examiner*—Masud Ahmed
(74) *Attorney, Agent, or Firm*—Greenblum & Bernstein P.L.C.

(57) ABSTRACT

A central position of each character participating in a battle is obtained as a fixation point, and multiple temporary points are set on a hemisphere around the fixation point. Each temporary viewpoint position is set on a straight line connecting the fixation point to each temporary point. Each temporary viewpoint position is a position from which all characters can be projected on a virtual screen when perspective transformation is executed at a predetermined visual angle and a distance to the fixation point is shortest. Points are given to each temporary viewpoint position based on the result of a distance evaluation, an angle evaluation, an overlap evaluation, and a height difference evaluation. The top scoring temporary viewpoint positions are selected as positions where the viewpoint of a virtual camera should be moved.

26 Claims, 12 Drawing Sheets

△ : POSITION OF CHARACTER

VIRTUAL CAMERA CONTROL METHOD IN THREE-DIMENSIONAL VIDEO GAME

CROSS REFERENCE TO RELATED APPLICATION

The present disclosure relates to subject matter contained in Japanese Patent Application No. 2003-58136, filed on Mar. 5, 2003, the disclosure of which is expressly incorporated herein by reference in its entirety.

BACKGROUND OF THE INVENTION

1. Field of the Invention

The present invention relates to a technique that determines a viewpoint position of a virtual camera when multiple characters exist in a virtual three-dimensional space in a three-dimensional video game.

2. Description of the Related Art

In a role playing game (RPG), a battle between player characters and enemy characters is generally performed in the process of the game. In the case of a three-dimensional video game, the state of the battle is perspective-transformed by a virtual camera provided on a battle field (battle map) and displayed on a display screen. A player can recognize the state of the game from only an image on the display screen.

In the conventional RPG, the image displayed on the display screen was generated by perspective-transforming a virtual three-dimensional space where the battle was performed by the virtual camera placed at a predetermined position. Regarding the position of the virtual camera, there was a fixed position and a moving position. Movement of the position of the virtual camera was performed by changing the position of the virtual camera to multiple predetermined positions, sequentially. The image projected from the same position was repeatedly displayed on the display screen, so that a change in the display screen becomes monotonous.

There is disclosed a technique of moving a viewpoint position of a virtual camera in a three-dimensional video game though this is not considered as an application to a battle in an RPG. Unexamined Japanese Patent Publication 2001-162040 discloses a technique in which a player presses an operation button corresponding to a mark with an allocated camera angle to change a viewpoint position of a virtual camera. Unexamined Japanese Patent Publication 10-113467 discloses a technique in which the position of a virtual camera is changed according to a player's viewpoint and an outside spectator's viewpoint.

However, in the technique disclosed in Unexamined Japanese Patent Publication 2001-162040, the viewpoint position of the virtual camera moves to only a predetermined position. This technique cannot solve the problem that a change in the display screen becomes monotonous. In the technique disclosed in Unexamined Japanese Patent Publication 10-113467, the viewpoint position of the virtual camera can freely move. The movement can be attained by only following one object (player (car) in this case).

On the contrary, the battle in an RPG cannot be established unless at least two characters including one player character and one enemy character exist. In the RPG battle, three or more characters exist in many cases. If the technique disclosed in Unexamined Japanese Patent Publication 10-113467 is used, the viewpoint position of the virtual camera moves with the movement of any one of the characters. In this case, the positions of the characters are one-sided and displayed on the display screen and some of the characters are not projected on the display screen in some cases.

If the viewpoint position of the virtual camera is set in a way to project the entire movement range of the characters participating in the battle, the problem that some of the characters are not projected on the display screen is eliminated. However, there is a problem that each character may be displayed small or the characters may be displayed on one-side according to the position where the character moved.

SUMMARY OF THE INVENTION

An object of the present invention is to provide a three-dimensional video game apparatus that is capable of moving a viewpoint position of a virtual camera to a suitable position with movement of a position of each character in a game in which multiple characters exist.

In order to achieve the above object, a three-dimensional video game apparatus according to a first aspect of the present invention is a three-dimensional video game apparatus that perspective-transforms a virtual three-dimensional space where multiple characters exist onto a virtual screen based upon a virtual camera having a viewpoint position moved in response to positions of the multiple characters. The three-dimensional video game apparatus includes a character mover that moves at least one of the characters in the virtual three-dimensional space. The three-dimensional video game apparatus further includes a central position calculator that calculates a central position of the characters in the virtual three-dimensional space. The three-dimensional video game apparatus further includes a temporary point setting device that sets multiple temporary points in the virtual three-dimensional space with reference to the calculated central position. The three-dimensional video game apparatus further includes a temporary viewpoint position setting section that sets a temporary viewpoint position on each straight line connecting, each of the temporary points to the central position, where all of the characters can be projected on the virtual screen with a predetermined visual angle. The three-dimensional video game apparatus further includes a distance calculator that calculates a distance between each of the set temporary viewpoint positions and the calculated central position. The three-dimensional video game apparatus further includes a viewpoint position evaluator that evaluates each temporary viewpoint position based on each calculated distance. The three-dimensional video game apparatus further includes a viewpoint position selector that selects a position where the viewpoint of the virtual camera should be moved among the temporary viewpoint positions based on the evaluation result. The three-dimensional video game apparatus further includes a viewpoint position mover that moves the viewpoint position of the virtual camera to the selected position. The three-dimensional video game apparatus further includes a perspective transformer that perspective-transforms the three-dimensional space onto the virtual screen based upon the virtual camera where the viewpoint position is moved.

In the three-dimensional video game, though the position of the character is changed by the character mover, the viewpoint position of the virtual camera is selected according to the position of the character. The viewpoint position of the virtual camera is selected among the temporary viewpoint positions where all characters can be projected on the virtual screen. For this reason, the three-dimensional video game apparatus can execute perspective transformation using the virtual camera while maintaining the viewpoint position at a suitable position. The three-dimensional video game apparatus displays all characters on the screen.

The viewpoint position evaluator evaluates the temporary viewpoint position based on the distance between the temporary viewpoint position calculated by the distance calculator and the central position. The viewpoint position of the virtual camera is selected based on the evaluation result. This results in a suitable size of the characters displayed on the screen.

The three-dimensional video game apparatus may further includes an angle calculator that calculates an angle formed by a straight line connecting a current viewpoint position of the virtual camera to the calculated central position and each straight line connecting each of the temporary viewpoint positions to the central position. In this case, the viewpoint position evaluator further evaluates each temporary viewpoint position based on the calculated angle.

The three-dimensional video game apparatus may further include an overlap degree calculator that calculates an overlap degree of the characters when the viewpoint of the virtual camera is set to each of the temporary viewpoint positions and perspective transformation is executed. In this case, the viewpoint position evaluator further evaluates each temporary viewpoint position based on the calculated overlap degree.

The three-dimensional video game apparatus may further include a height difference determining device that determines a height difference between the characters. In this case, the viewpoint position evaluator further evaluates each temporary viewpoint position based on the determination result of the height difference.

As explained above, the viewpoint position evaluator evaluates each temporary viewpoint position based on the angle formed by the straight line connecting the current viewpoint position of the virtual camera to the calculated central position and each straight line connecting each of the multiple temporary points to the central position, thereby allowing a reduction in an amount of movement of the viewpoint. By the reduction in the amount of movement, no feeling that something is wrong occurs when changing the displayed screen. The viewpoint position evaluator evaluates each temporary viewpoint position based on the overlap degree of the characters, thereby making it easy to view the characters on the displayed screen. The viewpoint position evaluator evaluates each temporary viewpoint position according to the height difference between the characters, thereby making it easy for the player to recognize the size of the characters on the displayed screen.

In order to achieve the above object, a three-dimensional video game apparatus according to a second aspect of the present invention is a three-dimensional video game apparatus that perspective-transforms a virtual three-dimensional space where multiple characters exist onto a virtual screen based upon a virtual camera having a viewpoint position moved in response to positions of the characters. The three-dimensional video game apparatus includes a memory that stores a game program, a processor that executes the game program, and a display device that displays a processing result of the processor. The game program is executed by the processor to move at least one of the characters in the virtual three-dimensional space. The game program further calculates a central position of the characters in the virtual three-dimensional space. The game program further sets multiple temporary points in the virtual three-dimensional space with reference to the calculated central position. The game program further sets a temporary viewpoint position on each straight line connecting, each of the multiple temporary points to the central position, where all of the characters can be projected on the virtual screen with a predetermined visual angle. The game program further calculates each distance between each of the set temporary viewpoint positions and the calculated central position. The game program further evaluates each temporary viewpoint position based on each calculated distance. The game program further selects a position where the viewpoint of the virtual camera should be moved among the temporary viewpoint positions based on the evaluation result. The game program further moves the viewpoint position of the virtual camera to the selected position. The game program further perspective-transforms the three-dimensional space onto the virtual screen based upon the virtual camera where the viewpoint position is moved.

The video game program stored in the memory in the video game apparatus according to the second aspect of the present invention can be recorded on a computer-readable storage medium. The computer-readable storage medium may be a storage medium constructed to be movably loaded on the computer apparatus and provided separately from the computer apparatus. The computer-readable storage medium may be a storage medium such as a fixed disc device that is included in the computer apparatus and provided together with the computer apparatus. In the video game program stored in the memory according to the second aspect of the present invention, the data signal can be superimposed on a carrier wave from a server apparatus existing on a network and the result is distributed via the network.

In the video game apparatuses according to the first and second aspects, it is possible to use a general-purpose computer such a personal computer, etc., in addition to a video game dedicated apparatus. In the video game apparatuses according to the first and second aspects, it is possible to use electronic equipment capable of operating as a computer apparatus such as a cellular phone, etc. Moreover, the apparatuses may be portable or stationary.

In order to achieve the above object, a control method of a virtual camera in a three-dimensional video game according to a third aspect of the present invention is a method for controlling a viewpoint position of a virtual camera based on positions of multiple characters existing in a virtual three-dimensional space in a three-dimensional video game that perspective-transforms the virtual three-dimensional space onto a virtual screen based upon the virtual camera. The method moves at least one of the characters in the virtual three-dimensional space. The method further calculates a central position of the characters in the virtual three-dimensional space. The method further sets multiple temporary points in the virtual three-dimensional space with reference to the calculated central position. The method further sets a temporary viewpoint position on each straight line connecting, each of the temporary points to the central position, where all of the characters can be projected on the virtual screen with a predetermined visual angle. The method further calculates a distance between each of the set temporary viewpoint positions and the calculated central position. The method further evaluates each temporary viewpoint position based on each calculated distance. The method further sets a position where the viewpoint of the virtual camera should be moved among the temporary viewpoint position based on the evaluation result. The method further moves the viewpoint position of the virtual camera to the selected position. The method further perspective-transforms the three-dimensional space onto the virtual screen based upon the virtual camera where the viewpoint position is moved.

DETAILED DESCRIPTION OF PREFERRED EMBODIMENT

An embodiment of the present invention will be specifically described with reference to the drawings.

Figure 1:
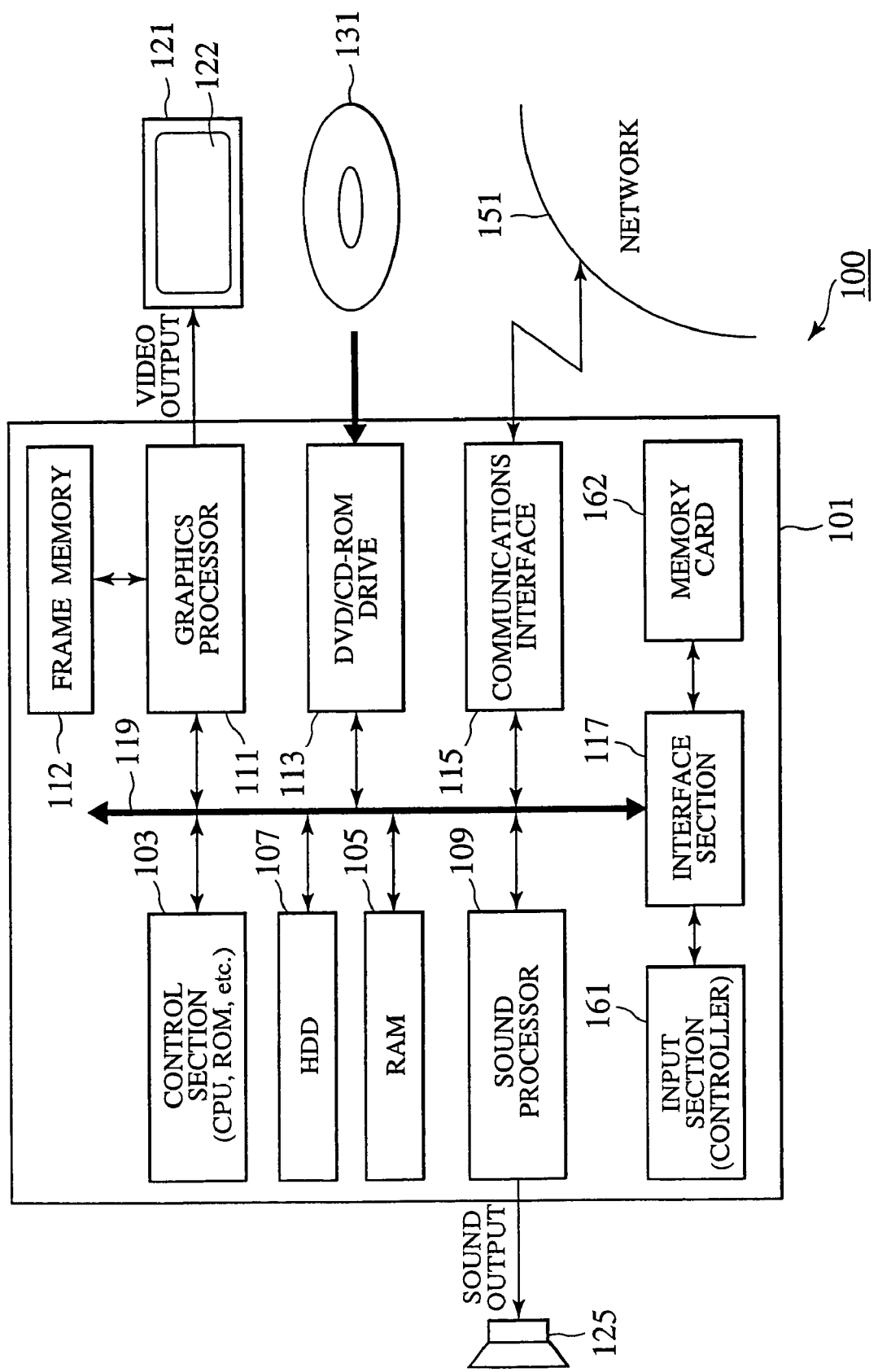
FIG. 1 is a block diagram illustrating a configuration of a video game apparatus to which an embodiment of the present invention is applied.

FIG. 1 is a block diagram illustrating a configuration of a video game apparatus 100 for executing a three-dimensional game according to this embodiment. As illustrated in the figure, a video game apparatus 100 includes a video game main body 101. The video game main body 101 includes a control section 103, a RAM (Random Access Memory) 105, a hard disk drive (HDD) 107, a sound processor 109, a graphics processor 111, a DVD/CD-ROM drive 113, a communications interface 115, and an interface section 117. The control section 103, the RAM 105, the HDD 107, the sound processor 109, the graphics processor 111, the DVD/CD-ROM drive 113, the communications interface 115, and the interface section 117 are connected to an internal bus 119.

The sound processor 109 of the video game main body 101 is connected to a sound output device 125, which is a speaker, and the graphics processor 111 is connected to a display device 121 having a display screen 122. A storage medium (DVD-ROM or CD-ROM) 131 can be attached to the DVD/CD-ROM drive 113. The communications interface 115 is connected to a network 151. An input section (controller) 161 and a memory card 162 are connected to the interface section 117.

The control section 103 includes a CPU (Central Processing Unit), a ROM (Read Only Memory), etc., and executes a program stored on the HDD 107 or the storage medium 131 to control the video game apparatus 100. The control section 103 has an internal timer. The RAM 105 is a work area for the control section 103. The HDD 107 is a storage area for storing a program and data. In the case where a program executed by the control section 103 instructs the sound processor 109 to output a sound, the sound processor 109 interprets the instruction and outputs a sound signal to the sound output device 125.

The graphics processor 111 develops an image onto the frame memory 112 and outputs a video signal, which displays the image on the display screen 122 of the display device 121 according to a drawing command output from the control section 103. It is assumed that one frame time of the image included in the outputting video signal is, for example, 1/30 sec. The DVD/CD-ROM drive 113 reads the program and data from the storage medium 131. The communications interface 115 is connected to the network 151 to perform communications with other computers.

The interface section 117 outputs input data sent from the input section 161 to the RAM 105, and the control section 103 interprets it to carry out arithmetic processing. The input section 161 includes a directional key and multiple operation keys. The directional key is used to move a cursor and input a message. The interface section 117 forwards data, indicative of the progress of the game stored in the RAM 105, to the memory card 162 based on the instruction from the control section 103. The interface section 117 reads data of the game stored in the memory card 162 at the time of suspending the game, and transfers the read data to the RAM 105.

The program and data for performing the game by the video game apparatus 100 are first stored on, for example, the storage medium 131. The program and data are read by the DVD/CD-ROM drive 113 and loaded onto the RAM 105 at the time of execution. The control section 103 processes the program and data loaded onto the RAM 105, outputs a drawing command to the graphics processor 111, and outputs an instruction of a sound output to the sound processor 109. Intermediate data is stored in the RAM 105 while the control section 103 performs processing.

A three-dimensional video game according to this embodiment will be next explained. This three-dimensional video game is a role playing game (RPG). A player operates the input section 161 to advance the game while moving the player characters on a map (field). When the player characters move to a predetermined point on the map, a battle between the player characters and enemy characters is started. When the player characters win the battle, they return onto the normal map and the progress of the game restarts.

Figure 2:
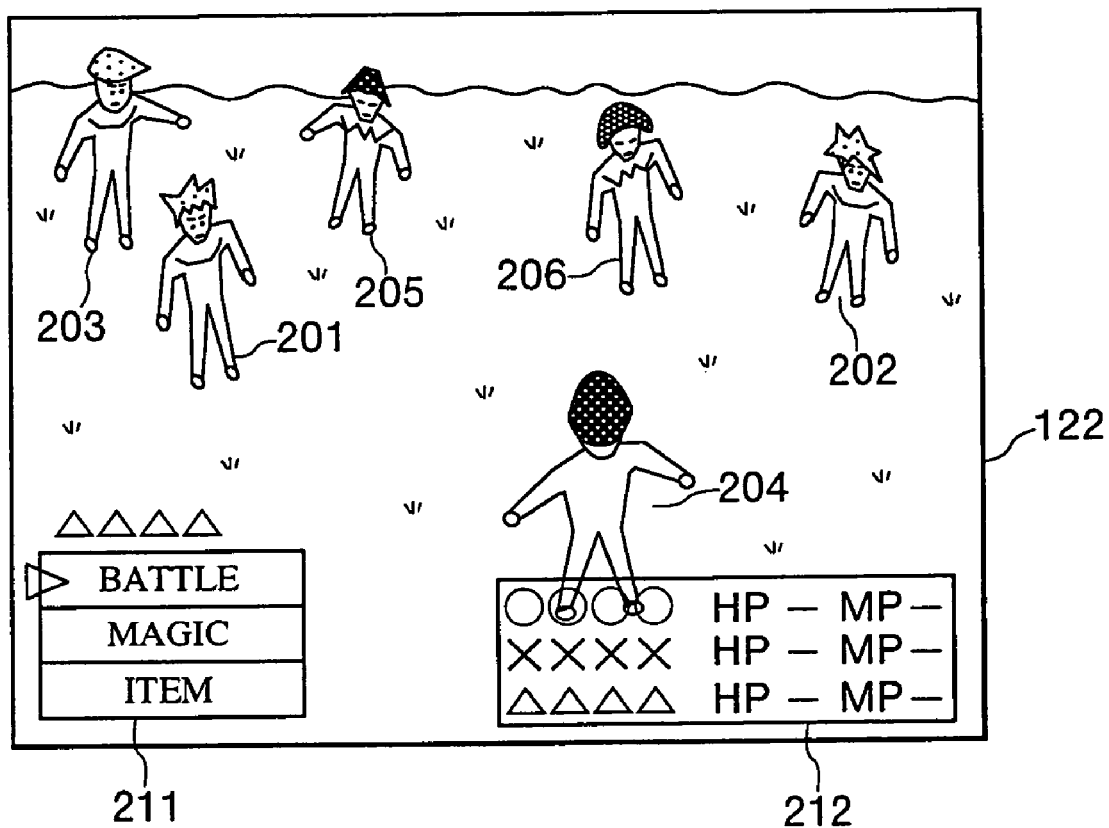
FIG. 2 is a view illustrating an example of a display screen at a battle time in a video game according to an embodiment of the present invention.

FIG. 2 is a view illustrating an example of a display screen 122 at a battle between the player characters and the enemy characters. The battle is performed on a battle map, which is different from a normal map. The battle map is set to have a predetermined size (larger than at least a range where the characters can move). The size predetermined on the battle map corresponds to the size of a range where a viewpoint position of a virtual camera (to be described later) is movable.

The example of FIG. 2 shows a case in which three player characters 201 to 203 battle with three enemy characters 204 to 206. During this battle, the player characters and enemy characters (hereinafter both referred to simply as characters) 201 to 206 act according to an instruction from the player or a program, and move to an arbitrary position on the battle map. The characters 201 to 206 may not move back to the original position after the action.

On the display screen 122 at the battle time, an image in which the battle map where the characters 201 to 206 exist is perspective-transformed and displayed. On the display screen 122 at the battle time, an action selecting section 211 and a status displaying section 212 are displayed at a front side of the image on the battle map where the characters 201 to 206 exist. The action selecting section 211 selects an action to be instructed to the player characters 201 to 203, and the status selecting section 212 displays a current status of each of the characters 201 to 203.

The respective positions (including the positions of the characters 201 to 206) on the battle map illustrated in FIG. 2 are shown by coordinates (X, Y, Z) of a world coordinate system to be described later. The characters 201 to 206 are polygonal-shaped, and shown by coordinates (x, y, z) of a local coordinate system. In the case of performing perspective transformation, coordinates (X', Y', Z') of a viewpoint coordinate system and coordinates of a screen coordinate system are used.

Figure 3:
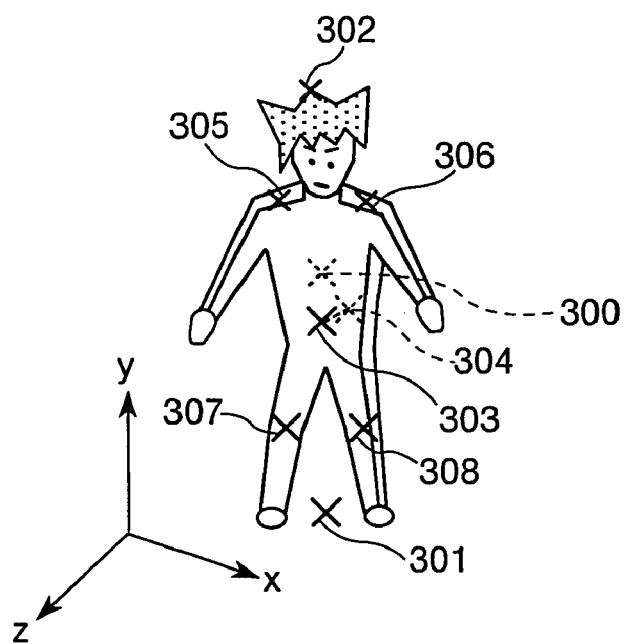
FIG. 3 is a view illustrating reference points set to each character appearing at a battle time in a video game according to an embodiment of the present invention.

FIG. 3 is a view illustrating an example of the characters 201 to 206 appearing at the battle time. Nine reference points 300 to 308 are set to the characters 201 to 206. At the time of deciding the viewpoint position of the virtual camera to be described later, only reference points 301 and 302 are used as positions of the characters 201 to 206. Characteristic points of the characters 201 to 206 (vertexes of the respective polygons) are shown by, for example, the coordinates (x, y, z) of the local coordinate system using the reference point 300, showing the center of gravity, as an origin. Each direction of the characters 201 to 206 is shown by an angle which each axis of the local coordinate system forms with each axis of the world coordinate system. At the time of performing perspective transformation, the coordinates of the characteristic points of the characters 201 to 206 are transformed to the coordinates of the world coordinate system.

Figure 4:
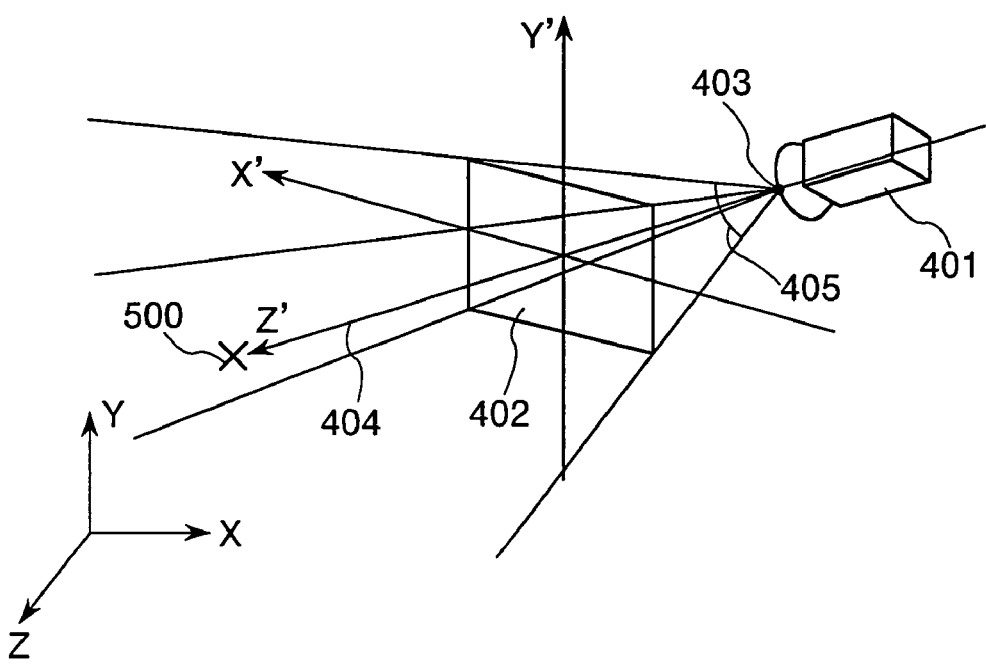
FIG. 4 is a view schematically illustrating processing for perspective-transforming a virtual three-dimensional space to display a video game according to an embodiment of the present invention.

The state that the player characters 201 to 203 battle with the enemy characters 204 to 206 is displayed on the display screen 122 by perspective-transforming a virtual three-dimensional space which the battle map is formed and recognized by each player. FIG. 4 schematically illustrates the state of the perspective transformation. A virtual camera 401 is placed in the virtual three-dimensional space and an image projected on a virtual screen 402 is displayed on the display screen 122. The position of the virtual camera 401 is a viewpoint 403, the direction of the virtual camera 401 is a visual axis (optical axis) 404, and an angle that is formed by two straight lines obtained by connecting the viewpoint 403 to a diagonal vertex of the virtual screen 402 is a visual angle 405.

A coordinate system used to project an image on the virtual screen 402 is a viewpoint coordinate system (X', Y', Z'), and the direction of the visual axis 404 is a Z' axis of the viewpoint coordinate system. The coordinates of the world coordinate (including coordinates transformed from coordinates of the local coordinate system) are transformed to the coordinates of the viewpoint coordinate system. The coordinates X' and Y' of the viewpoint coordinate system are further transformed to the coordinates of the screen coordinate system. In order to generate an image projected on the virtual screen 402 by the perspective transformation, there is a need to perform hidden surface removal that removes a surface hidden by another object placed in the front. A Z buffer method is used as the hidden surface removal method. However, since this is not related to the present invention, the specific explanation is omitted.

On the precondition that the perspective transformation is performed, there is a need for determining the position of the viewpoint 403 of the virtual camera 401, the direction of the visual axis 404 and the size of the visual angle 405. When the position of the viewpoint 403, the direction of the visual axis 404 and the size of the visual angle 405 are decided, the position of the virtual screen 402 is inevitably determined. The direction of the visual axis 404 is always directed to a fixation point 500 calculated as a central position of each of the characters 201 to 206 to be described later. The size of the visual angle 405 is set to be basically the same except for the case that adjustment is made as described later.

The position of the viewpoint 403 is decided for each fixed time according to the progress of the battle and moved to the decided position. At the time of deciding the position of the viewpoint 403, multiple temporary points are set with reference to the fixation point 500. Multiple temporary viewpoint positions are set on a straight line that connects each temporary point to the fixation point 500. Among the multiple temporary viewpoint positions, the position of the viewpoint 403 is decided based on scores obtained by performing a distance evaluation, an angle evaluation, an overlap evaluation, and a height evaluation to be described later.

The following will explain processing in the three-dimensional video game according to this embodiment. In the three-dimensional video game according to this embodiment, when the player characters move on the normal map and reach a predetermined position, they start to battle with the enemy characters, and when the battle ends, they return to the normal map. This operation is repeated, so that the game progresses. When the player characters move on the normal map, processing relating to the present invention is not executed. The following will explain only the battle processing where the processing relating to the present invention is executed. When the battle starts, the battle map appears, and control processing of the virtual camera 401, which is unique to the battle time, and perspective transformation processing (which is not unique to the battle time) are executed in parallel with each other.

Figure 5:
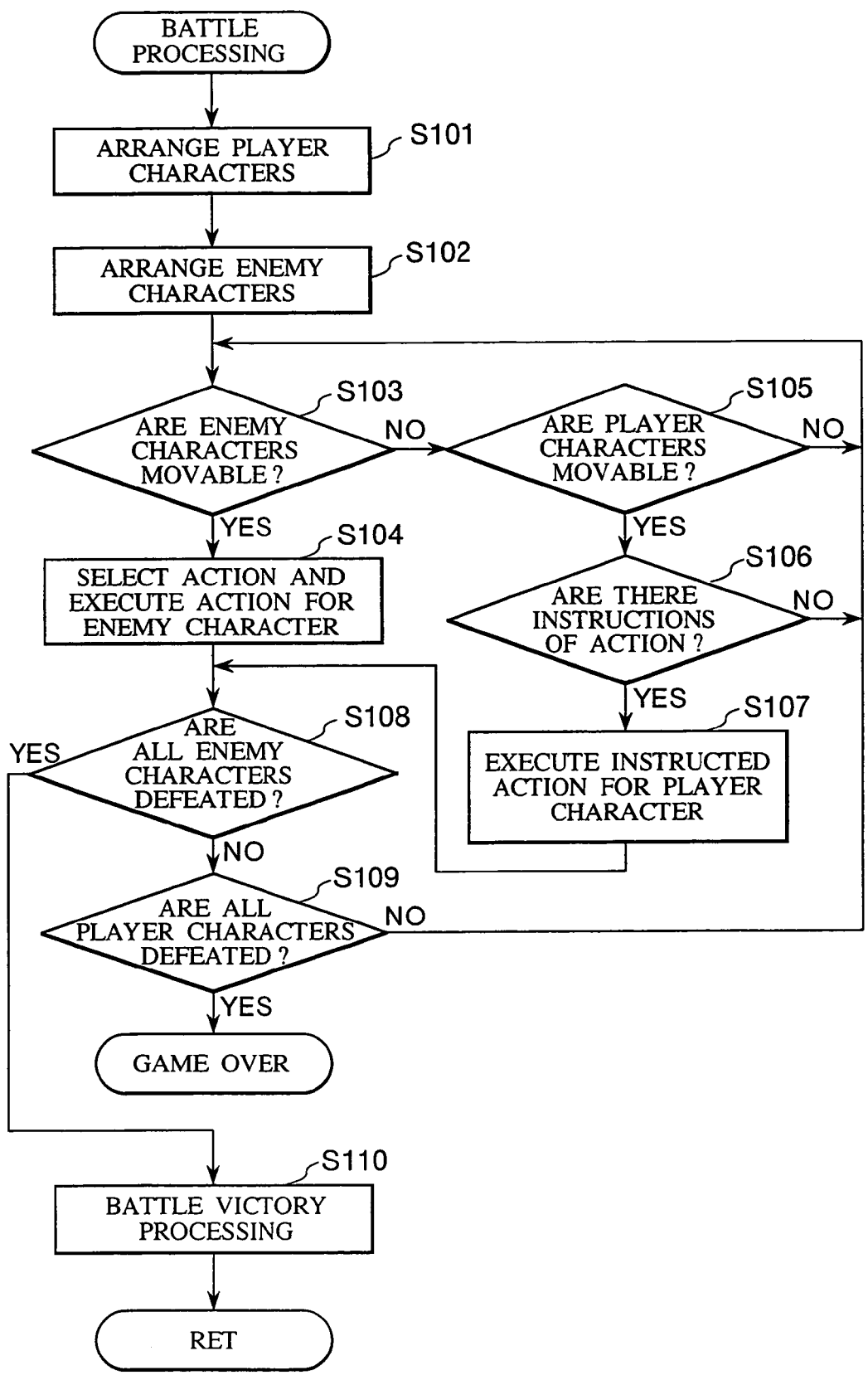
FIG. 5 is a flowchart illustrating battle processing between player characters and enemy characters in a video game according to an embodiment of the present invention.

FIG. 5 is a flowchart illustrating battle processing between the player characters and the enemy characters. In the battle processing, the control section 103 arranges multiple player characters 201 to 203 on the battle map (step S101). The control section 103 selects the kind of enemy character and the number of enemy characters according to the location where the battle occurred, and arranges the selected enemy characters 204 to 206 on the battle map (step S102). The player characters 201 to 203 and the enemy characters 204 to 206 arranged on the map become movable for each fixed time set by its status. The player characters 201 to 203 may be prevented from becoming movable until another player character, which previously became movable, starts to act.

When the player characters 201 to 203 and the enemy characters 204 to 206 are arranged, the control section 103 judges whether any one of the enemy characters becomes movable (step S103). When there is an enemy character that becomes movable, the control section 103 selects an action of the enemy character and causes the enemy character to execute the selected action. The control section 103 also causes the player characters 201 to 203 and the other enemy characters to execute predetermined actions as required according to the result of this action (step S104). The actions of the characters include movement of position on the map. The positions of characters may differ before and after their actions, respectively (the same is applied to step S107 to be described later). Then, the processing flow proceeds to step S108.

When there is no enemy character that becomes movable, the control section 103 judges whether any one of the player characters 201 to 203 becomes movable (step S105). When there is no player character that becomes movable, the processing flow goes back to step S103. When there is a player character that becomes movable, the control section 103 causes the display section 122 to display the action selecting section 211. The control section 103 judges whether an action is instructed to the movable player character (step S106). When no action is instructed, the processing flow goes back to step S103.

When the action is instructed, the control section 103 causes the player character to execute the instructed action. The control section 103 also causes the enemy characters 204 to 206 and the other player characters to execute predetermined actions as required based on the result of the action (step S107). Then, the processing flow proceeds to step S108. In step S104 or S107, a character becomes in a battle impossible state when a predetermined parameter (for example, HP) is 0. The control section 103 removes an enemy character that is in a battle impossible state from the battle map.

In step S108, the control section 103 judges whether all enemy characters 204 to 206 are in a battle impossible state and the player characters 201 to 203 defeat the enemy characters 204 to 206 as a result of the battle. When the player characters 201 to 203 do not defeat all of the enemy characters, the control section 103 judges whether all player characters 201 to 203 are in a battle impossible state and all player characters 201 to 203 are defeated by the enemy characters 204 to 206 as a result of the battle (step S109). When all player characters 201 to 203 are not defeated by the enemy characters 204 to 206, the processing flow goes back to step S103.

When the player characters 201 to 203 defeat all of the enemy characters in step S108, the control section 103 executes a predetermined battle victory processing (step S110). The control section 103 ends battle processing, and returns onto the normal map to restart the progress of the game. When all player characters 201 to 203 are defeated by the enemy characters 204 to 206 in step S109, the game is over and processing ends.

Figure 6:
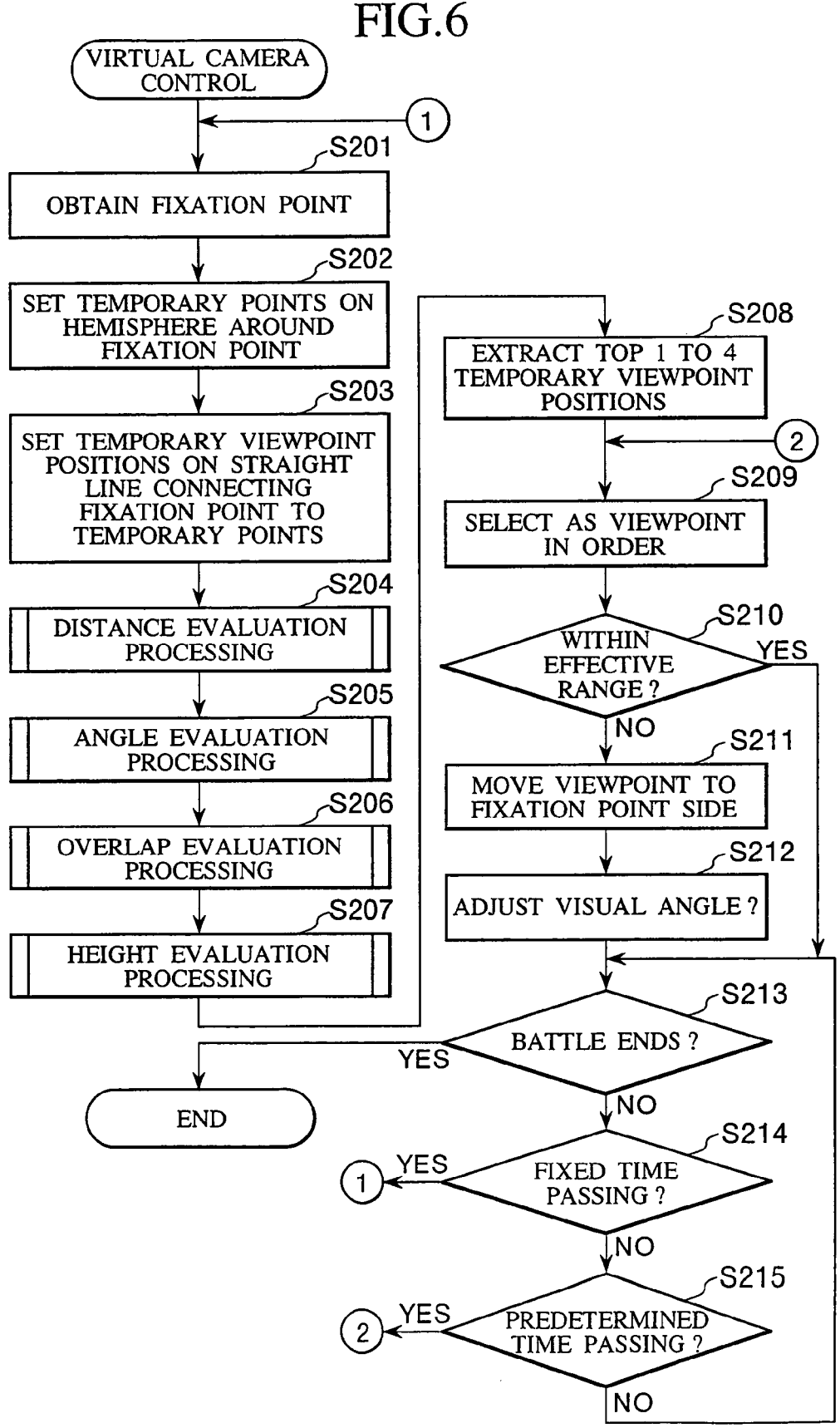
FIG. 6 is a flowchart illustrating control processing of a virtual camera at a battle time in a video game according to an embodiment of the present invention.

FIG. 6 is a flowchart illustrating control processing of the virtual camera 401 at the battle time. At the time other than the battle time such as the time when each player character moves on the normal map, different control processing of the virtual camera 401 is executed.

In control processing of the virtual camera 401 at the battle time, the control section 103 obtains central positions of all characters (including the player characters and the enemy characters) participating in the battle as the fixation point 500 (step S201). Coordinates $(X_p, Y_p, Z_p)$ of the fixation point 500 can be obtained by the equation (1) shown below. $(X_k, Y_k, Z_k)$ indicate coordinates of the world coordinate system of the reference point 301 placed below the feet of the kth character participating in the battle. It is assumed that the number of characters participating in the battle is n.

$$(X_p, Y_p, Z_p) = \left( \frac{\sum_{k=1}^{n} X_k}{n}, \frac{\sum_{k=1}^{n} Y_k}{n}, \frac{\sum_{k=1}^{n} Z_k}{n} \right) \quad (1)$$

The control section 103 provides a virtual hemisphere in the virtual three-dimensional space around the fixation point 500 obtained in the step S201, and sets multiple temporary points with predetermined intervals on polar coordinates around the fixation point 500 on the hemisphere (step S202). The control section 103 sets a temporary viewpoint position on each straight line that connects the fixation point 500 to each temporary point. A position from which all characters can be projected on the virtual screen 402 and a distance to the fixation point 500 is shortest is set as the temporary viewpoint position, when the visual angle 405 is set to a predetermined size and the virtual three-dimensional space is perspective-transformed. The control section 103 also obtains a distance between the fixation point 500 and each temporary viewpoint position (step S203).

Figure 7A:
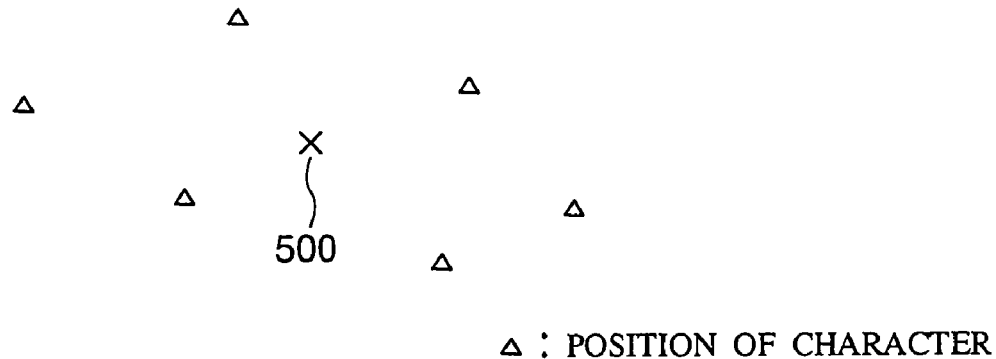
FIGS. 7A to 7C are views explaining processing including a decision of a fixation point to a decision of a temporary viewpoint position for controlling a virtual camera at a battle time.
Figure 7B:
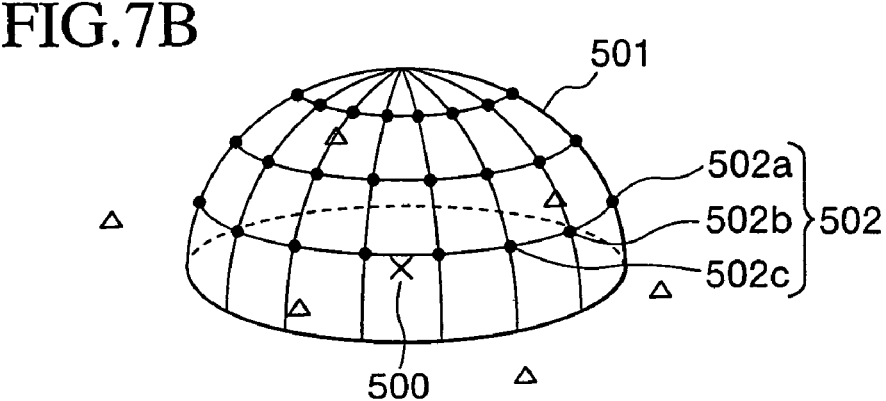
Figure 7C:
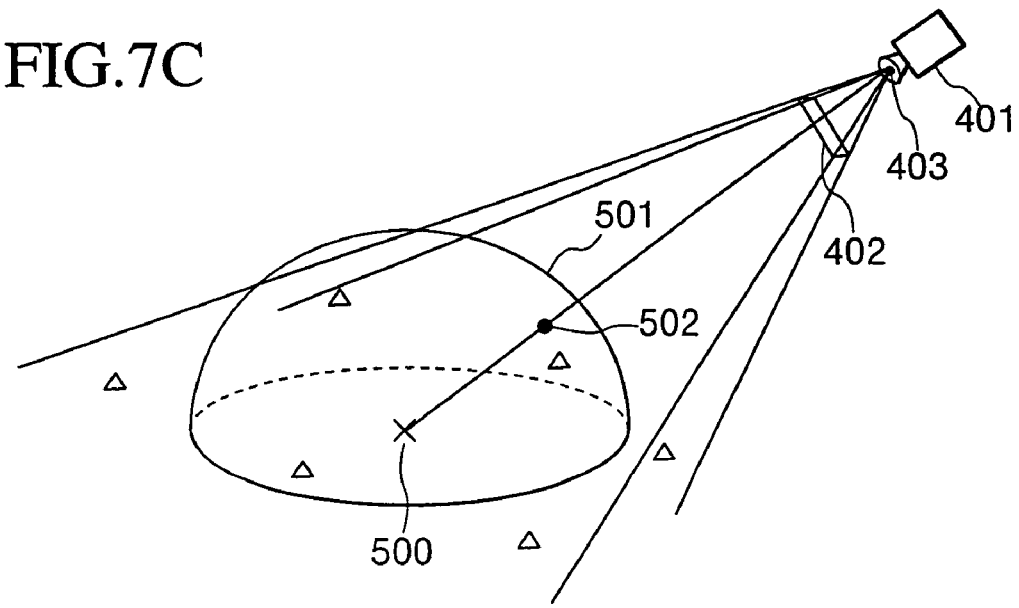

The following will explain the processing including the decision of the fixation point 500 in step S201 to the decision of the temporary viewpoint position in step S203 with reference to FIGS. 7A to 7C. As illustrated in FIG. 7A, when it is assumed that six characters are present on the battle map, the central position of the characters is obtained as the fixation point 500. As illustrated in FIG. 7B, a virtual hemisphere 501 is drawn around the fixation point 500. The hemisphere 501 has multiple temporary points 502 (502a, 502b, 502c, . . . ). A direction to each temporary point 502 from the fixation point 500 is predetermined by the polar coordinates around the fixation point 500.

As illustrated in FIG. 7C, when the position of the viewpoint 403 of the virtual camera 401 is placed on a straight line connecting the fixation point 500 to each temporary point 502, a position where all characters can be projected on the virtual screen 402 and a distance from the fixation point 500 is shortest is set as the temporary viewpoint position. The control section 103 judges whether each character can be projected on the virtual screen 402 based on only the reference point 301 placed below the feet and a reference point 302 above the head.

Figure 8:
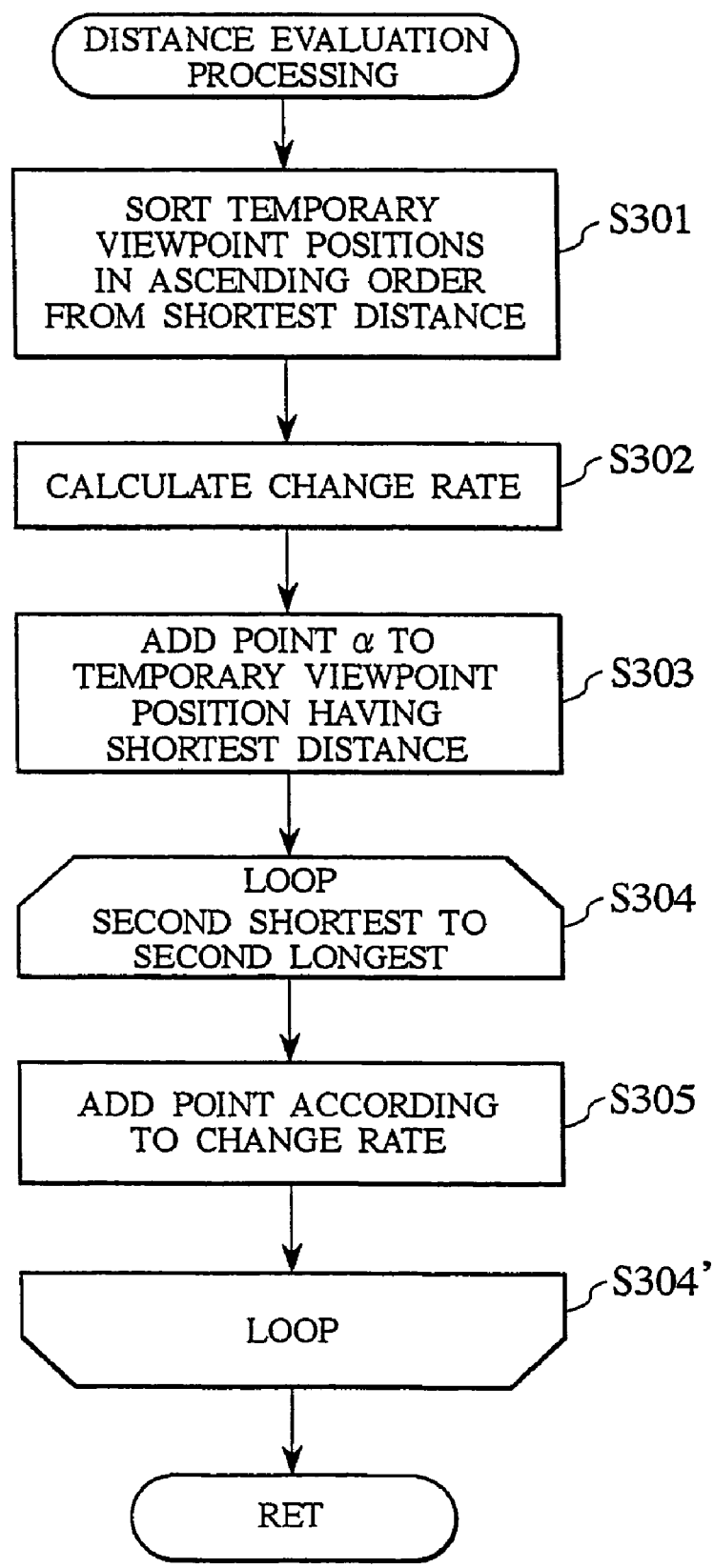
FIG. 8 is a flowchart illustrating distance evaluation processing of FIG. 6.

When the temporary viewpoint points are set, the control section 103 evaluates a distance from each temporary viewpoint position to the fixation point 500 and executes a distance evaluation processing that gives a score corresponding to the evaluation result to each temporary viewpoint position (step S204). The distance evaluation processing will be specifically explained with reference to the flowchart of FIG. 8.

In the distance evaluation processing, the control section 103 sorts the respective temporary viewpoint positions in ascending order from the shortest distance to the fixation point 500 (step S301). The control section 103 obtains a difference between the longest distance from the temporary viewpoint position to the fixation point 500 and the shortest distance. The control section 103 divides a value a (a is a constant) given as a maximum score of the distance evaluation by the obtained difference to calculate a change rate (step S302). Each value of the constants a, β, γ and d (described later) is determined according to the importance of the corresponding evaluation.

The control section 103 stores the maximum value a as a score of the temporary viewpoint position having the shortest distance (step S303). The control section 103 executes loop processing by changing the processing temporary viewpoint positions in order from the second shortest distance to the second longest distance (steps S304 to S304').

In the loop processing, the control section 103 obtains a difference between the distance from the processing temporary viewpoint position to the fixation point 500 and the shortest distance. The control section 103 multiplies the obtained difference by the change rate obtained in the step S302, and adds the result to the score of the processing temporary viewpoint position (step S305). When the loop processing of all temporary viewpoint positions ends, the control section 103 ends the distance evaluation processing. Since the temporary viewpoint position having the longest distance to the fixation point 500 is not processed in the loop processing, a score for the temporary viewpoint in the distance evaluation processing is 0.

Figure 9:
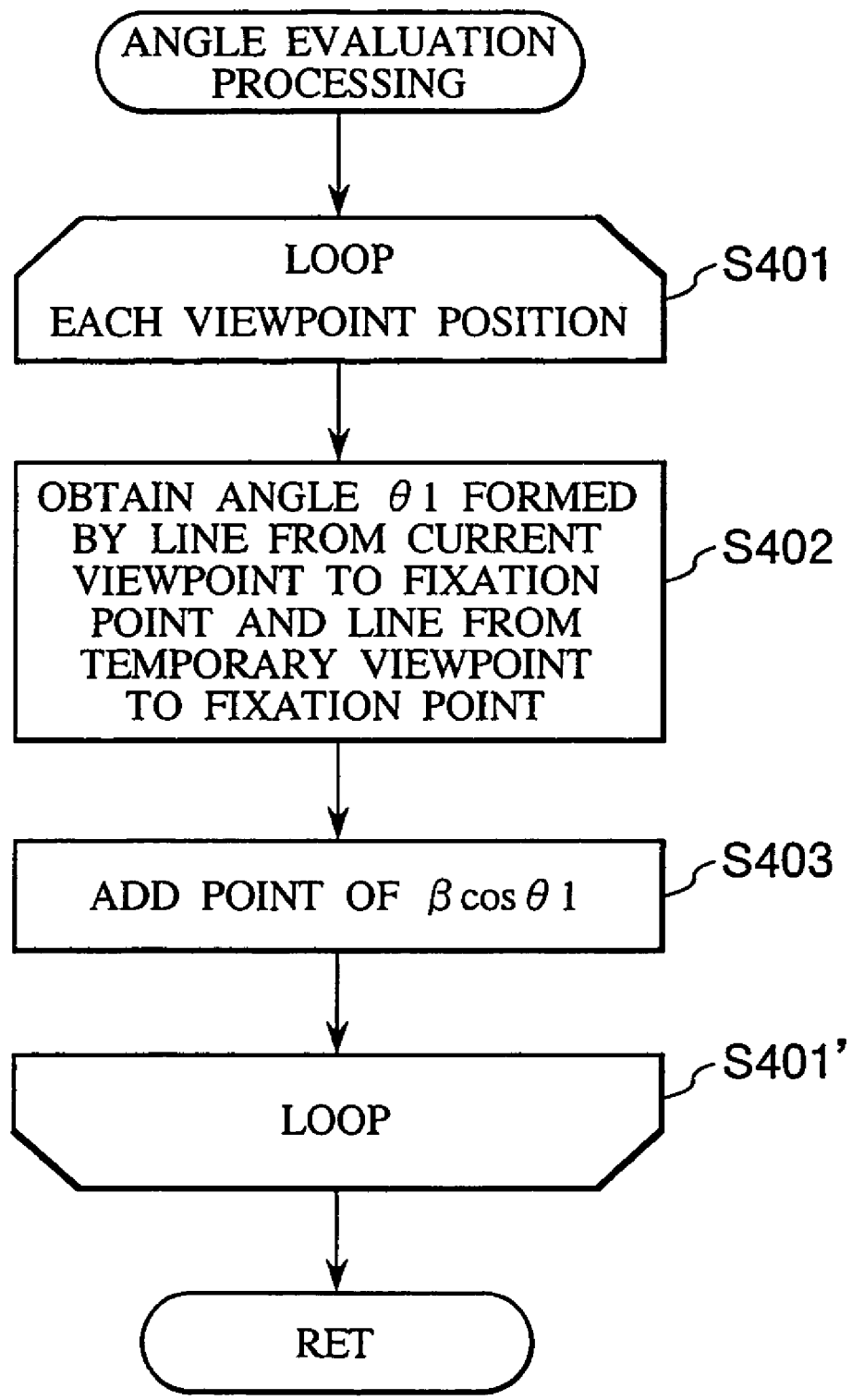
FIG. 9 is a flowchart illustrating angle evaluation processing of FIG. 6.

When the distance evaluation processing ends, the processing flow goes back to the flowchart of FIG. 6 and the control section 103 executes angle evaluation processing that evaluates an angle formed by a straight line connecting each temporary viewpoint position to the fixation point 500 and a straight line connecting the current position of the viewpoint 403 to the fixation point 500 to give a score corresponding to the evaluation result to each temporary viewpoint position (step S205). The angle evaluation processing will be specifically explained with reference to the flowchart of FIG. 9.

In the angle evaluation processing, the control section 103 executes loop processing by changing the processing temporary viewpoint positions sequentially (step S401 to S401'). In the loop processing, the control section 103 obtains an angle θ1 formed by the line from the current position of the viewpoint 403 of the virtual camera 401 to the position of the fixation point 500 and the line from the processing temporary viewpoint position to the position of the fixation point 500 (step S402). The control section 103 obtains β cos θ1 (β is a constant) and adds it to the score of the processing temporary viewpoint position (step S403). When the loop processing of all temporary viewpoint positions ends, the control section 103 ends the angle evaluation processing.

Figure 10:
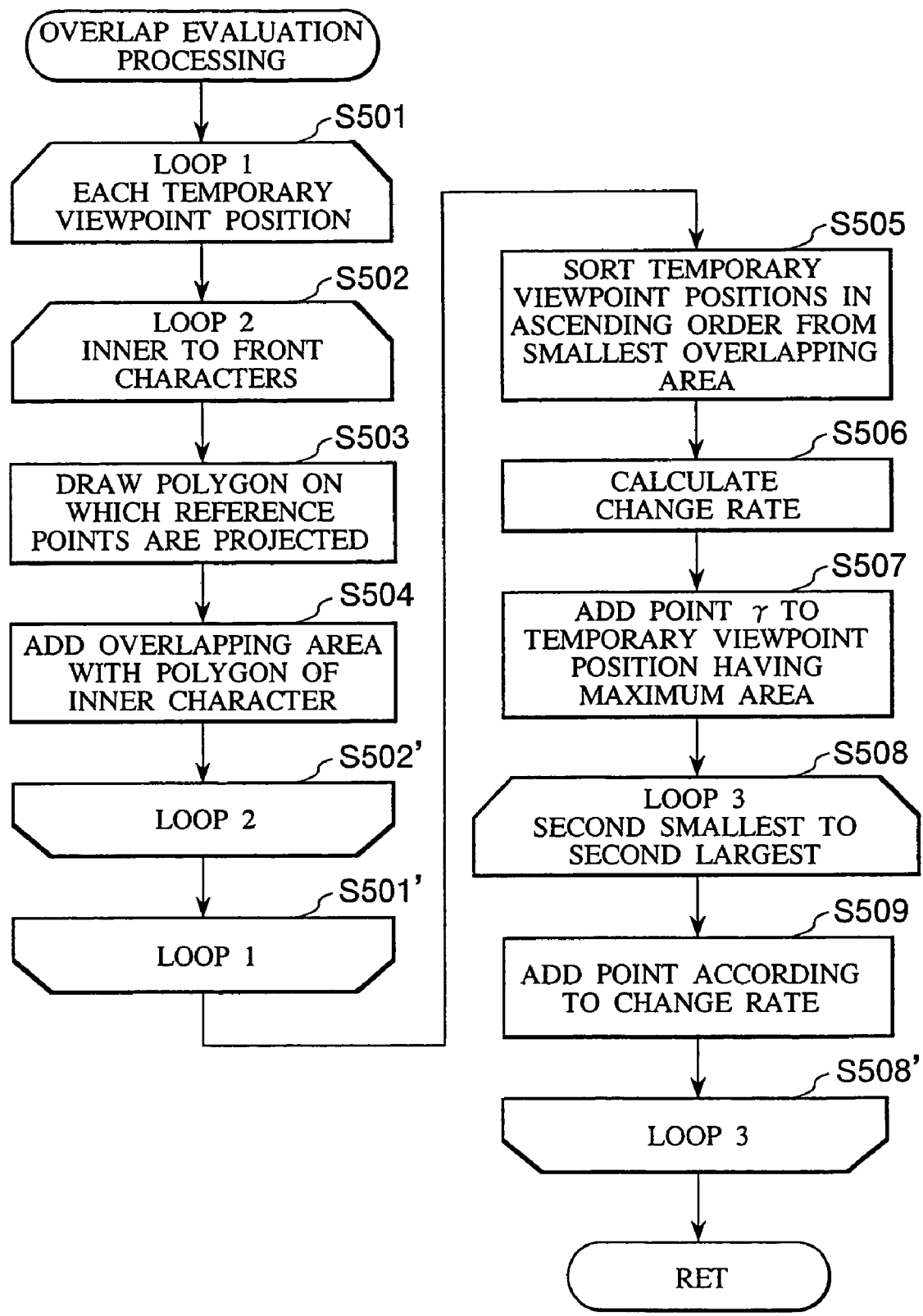
FIG. 10 is a flowchart illustrating overlap evaluation processing of FIG. 6.

When the angle evaluation processing ends, the processing flow goes back to the flowchart of FIG. 6 and the control section 103 executes overlap evaluation processing that evaluates to what degree the characters are displayed on the virtual screen 402 in an overlapping state when perspective transformation is executed from each temporary viewpoint position to give a score corresponding to the evaluation result to each temporary viewpoint position (step S206). The overlap evaluation processing will be specifically explained with reference to the flowchart of FIG. 10.

In the overlap evaluation processing, the control section 103 first executes loop 1 processing as changing the processing temporary viewpoint positions sequentially (step S501 to S501'). In the loop 1 processing, the control section 103 executes loop 2 processing as changing the processing character existing from rear to front (steps S502 to S502'). The positions where the characters exist can be judged based on only the value of the Z' coordinate of the reference point 300 of the center of gravity of each character.

In the loop 2 processing, when it is assumed that perspective transformation is executed from the temporary viewpoint position, the control section 103 projects reference points 301 to 308 of the processing character except for the center of gravity thereof on the virtual screen to draw a polygon (step S503). The control section 103 obtains an area of a portion where the drawn polygon overlaps with the previously drawn polygon (when the drawn polygon overlaps with two or more polygons, each area is obtained), and adds it as an overlapping area of the relevant viewpoint position (step S504). When the loop 2 processing of all characters ends, a temporary viewpoint position to be processed in the loop 1 processing becomes a next temporary viewpoint position. When the loop 1 processing of all temporary viewpoint positions ends, the control section 103 evaluates the overlapping area of each temporary viewpoint position.

The control section 103 sorts the respective temporary viewpoint positions in ascending order from the obtained smallest overlapping area (step S505). The control section 103 obtains a difference between the smallest overlapping area and the largest overlapping area. The control section 103 divides a value γ (γ is a constant) given as a maximum score of the overlap evaluation by the obtained difference to calculate a change rate (step S506).

The control section 103 adds the maximum value γ to the score of the temporary viewpoint position having the smallest overlapping area (step S507). The control section 103 executes loop 3 processing by changing the processing temporary viewpoint positions in order from the second smallest overlapping area to the second largest overlapping area (steps S508 to S508').

In the loop 3 processing, the control section 103 obtains a difference between the overlapping area of the processing temporary viewpoint position and the smallest overlapping area of all temporary viewpoint positions. The control section 103 multiplies the obtained difference by the change rate obtained in the step S506, and adds the result as a score of the processing temporary viewpoint position (step S509). When the loop 3 processing of all temporary viewpoint positions ends, the control section 103 ends the overlap evaluation processing. Since the temporary viewpoint position having the largest area is not processed in the loop processing 3, a score for the temporary viewpoint position in the distance evaluation processing is 0.

Figure 11:
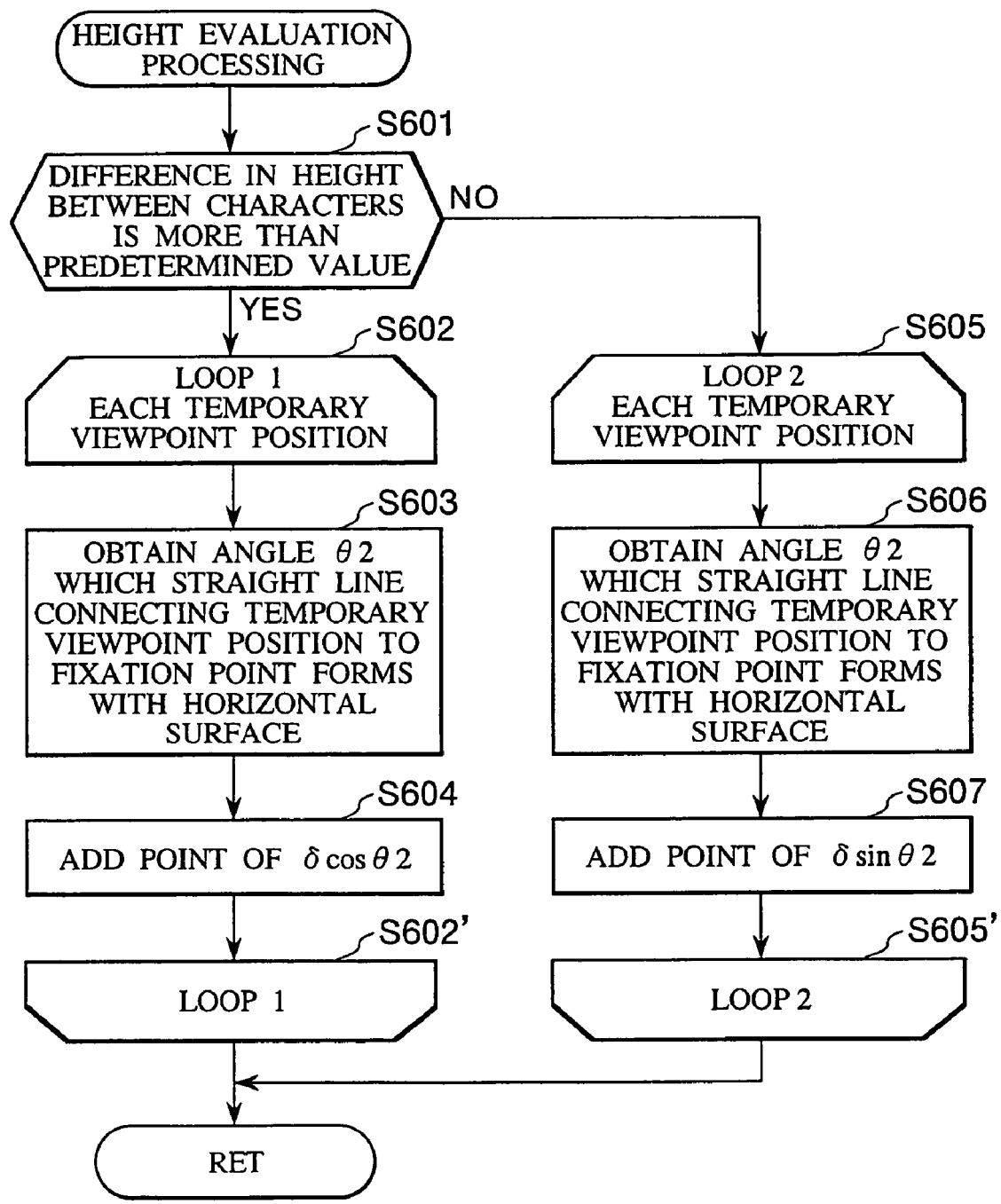
FIG. 11 is a flowchart illustrating height evaluation processing of FIG. 6.

When the overlap evaluation processing ends, the processing flow goes back to the flowchart of FIG. 6 and the control section 103 executes height evaluation processing that evaluates a height of each temporary viewpoint position according to a difference in height between the characters to give a score corresponding to the evaluation result to each temporary viewpoint position (step S207). The height evaluation processing will be specifically explained with reference to the flowchart of FIG. 11.

In the height evaluation processing, the control section 103 judges whether a difference in height between the characters participating in the battle (difference between the maximum height and the minimum height) is more than a predetermined value (step S601). When the difference in height is more than the predetermined value, the control section 103 executes loop 1 processing by changing the processing temporary viewpoint positions sequentially (step S602 to S602'). When the difference in height is not more than the predetermined value, the control section 103 executes loop 2 processing by changing the processing temporary viewpoint positions sequentially (step S605 to S605').

In the loop 1 processing, the control section 103 obtains an angle θ2 which a straight line connecting the processing temporary viewpoint position to the fixation point 500 forms with a horizontal surface (a surface where the Y coordinate of the world coordinate system is 0) (step S603). The control section 103 obtains d cos θ2 (d is a constant) and adds it to the score for the processing temporary viewpoint position (step S604). When the loop 1 processing of all temporary viewpoint positions ends, the control section 103 ends the height evaluation processing.

In the loop 2 processing, the control section 103 obtains an angle θ2 which a straight line connecting the processing temporary viewpoint position to the fixation point 500 forms with a horizontal surface (step S606). The control section 103 obtains d sin θ2 (d is a constant) and adds it to the score for the processing temporary viewpoint position (step S607). When the loop 2 processing of all temporary viewpoint positions as processing objects ends, the control section 103 ends the height evaluation processing.

When the height evaluation processing ends, a total score of each temporary viewpoint position is obtained. The control section 103 extracts temporary viewpoint positions including the top 4 total scores (step S208). The control section 103 selects the extracted four temporary viewpoint positions as positions of the viewpoint 403 of the virtual camera 401 in the order of 1st place→2nd place→3rd place→4th place→1st place ... The position that is first selected as the position of the viewpoint 403 is the temporary viewpoint position whose total score ranks first (step S209).

When the position of the viewpoint 403 of the virtual camera 401 is selected, the control section 103 judges whether the selected position of the viewpoint 403 is within an effective range of the battle map in which the virtual camera 401 is movable and no obstacle exists between the viewpoint 403 and the fixation point 500 or between the viewpoint 403 and each character (step S210). When the selected position of the viewpoint 403 is in the effective range, the processing directly proceeds to step S213.

When the selected position of the viewpoint 403 is not in the effective range, the control section 103 moves the position of the viewpoint 403 to the fixation point 500 until the position enters the effective range (step S211). When perspective transformation is executed at the moved position of the viewpoint 403, the control section 103 adjusts the visual angle 405 of the virtual camera 401 such that all characters are projected on the virtual screen 402 (step S212). Then, the processing proceeds to step S213.

In step S213, the control section 103 judges whether the battle processing of FIG. 5 ends. When the battle processing does not end, the control section 103 judges whether a fixed time has passed since the position of the viewpoint 403 of the virtual camera 401 was recalculated (step S214). When the fixed time has not passed, the control section 103 judges whether a specified time, which is longer than the fixed time, has passed since the position of the viewpoint 403 of the virtual camera 401 was changed (step S215). When the specified time has not passed, the processing goes back to step S213.

When the specified time has passed in step S215, the processing goes back to step S209 and the control section 103 reselects a next temporary viewpoint position as the position of the viewpoint 403 of the virtual camera 401. When the fixed time has passed in step S214, the processing goes back to step S201 and the control section 103 executes processing again from the decision of the position of the fixation point 500. When the battle processing ends in step S213, the processing of this flowchart ends. When the battle processing ends, the processing is shifted to control processing of the virtual camera 401 that is different from the flowchart of FIG. 6.

Figure 12A:
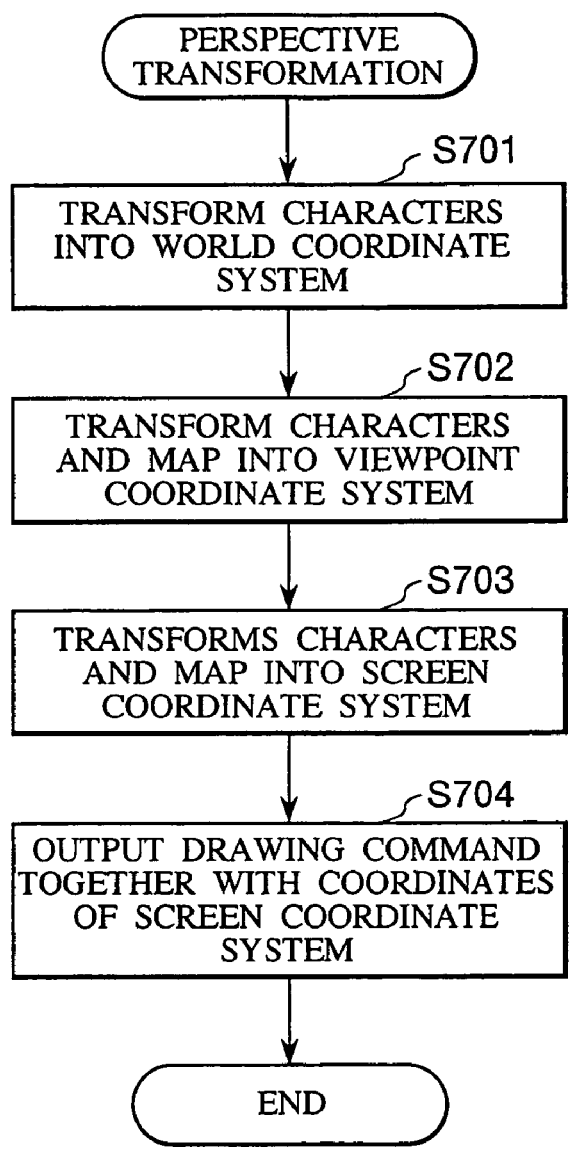
FIGS. 12A and 12B are flowcharts illustrating processing in which a virtual three-dimensional space is perspective-transformed to generate a display screen in a video game according to an embodiment of the present invention.
Figure 12B:
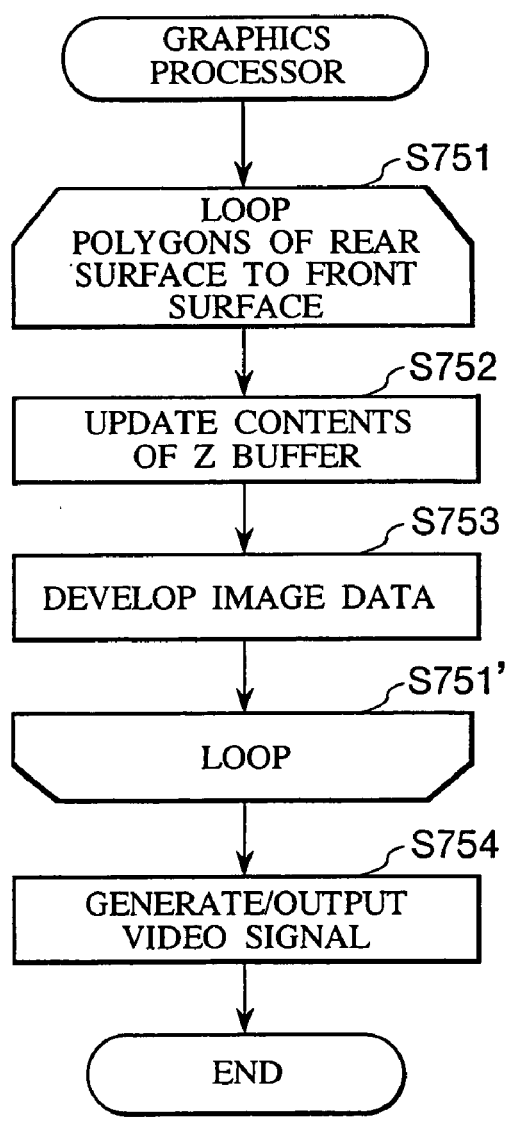

In parallel with the aforementioned battle processing and control processing of the virtual camera 401, perspective transformation processing is executed by timer interruption occurring every frame period. FIG. 12A illustrates processing that is executed by the control section 103 in the perspective transformation processing, and FIG. 12B illustrates processing that is executed by the graphics processor 111. Regarding the perspective transformation processing, the same processing is executed regardless of whether the progress of the game is in a battle. The perspective transformation processing may be executed every two frame periods depending on the amount of processing that is required for the perspective transformation processing, and the same image may be displayed on the display screen 122 for two frame periods.

As illustrated in FIG. 12A, the control section 103 transforms the coordinates of the local coordinate system of the characteristic points of all characters into coordinates of the world coordinate system (step S701). The control section 103 transforms the coordinates of the points, which form the respective surfaces constituting the characters included in the range of the perspective transformation and the map, into the coordinates of the viewpoint coordinate system according to the coordinates of the world coordinate system of the viewpoint 403 and the direction of the visual axis 404 (step S702). The control section 103 transforms X' and Y' coordinates of the viewpoint coordinate system transformed in step S702 into the coordinates of the screen coordinate system (step S703).

The control section 103 sends the coordinates of the points constituting the respective surfaces transformed into the screen coordinate system (including Z' coordinates of the viewpoint coordinate system) to the graphics processor 111, and outputs a drawing command to the graphics processor 111 (step S704). By the output of the drawing command, processing, which the control section 103 executes for perspective transformation, ends. Processing for drawing the image projected on the virtual screen 402 to output to the display device 122 as a video signal is executed by the graphics processor 111.

As illustrated in FIG. 12B, the graphics processor 111 executes loop processing as changing the processing polygon from the rear side to the front side based on the Z' coordinate of the screen coordinate system that was received together with the drawing command (steps S751 to S751'). In the loop processing, the graphics processor 111 updates the contents of a Z buffer to leave data of a point existing in the front (small value of Z' coordinate) (step S752). When the contents of the Z buffer are updated, the graphics processor 111 develops image data of the polygon onto the frame memory 112. The graphics processor 111 also executes processing such as shading, texture mapping and the like to developed image data (step S753).

When processing of all polygons ends, loop processing finishes. The graphics processor 111 reads image data developed onto the frame memory 112 sequentially, adds a synch signal to generate a video signal, and outputs it to the display device 121 (step S754). Accordingly, the processing by the graphics processor 111 ends. The display device 121 displays an image corresponding to the video signal output from the graphics processor 111 on the display screen 122. By switching the display screen 122 every single frame period, the player can view the image of the battle between the player characters 201 to 203 and the enemy characters.

Figure 13A:
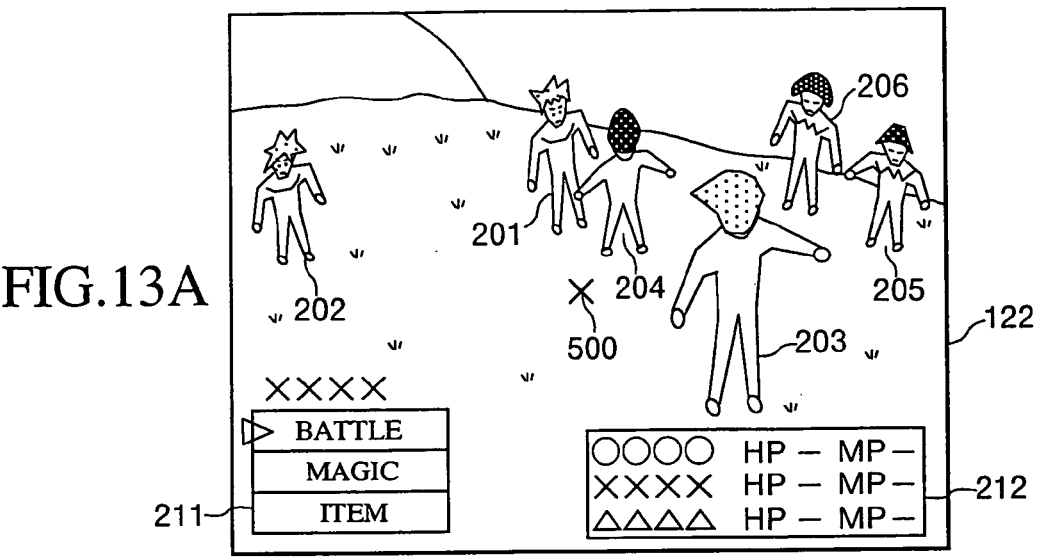
FIGS. 13A to 13C are views explaining a change in a display screen by movement of a viewpoint position of a virtual camera in a video game according to an embodiment of the present invention.
Figure 13B:
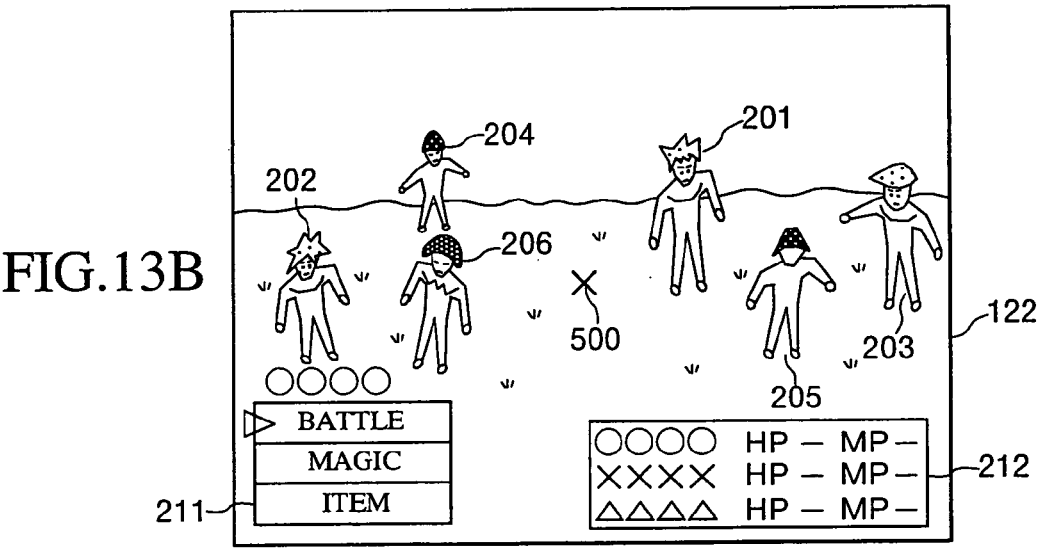
Figure 13C:
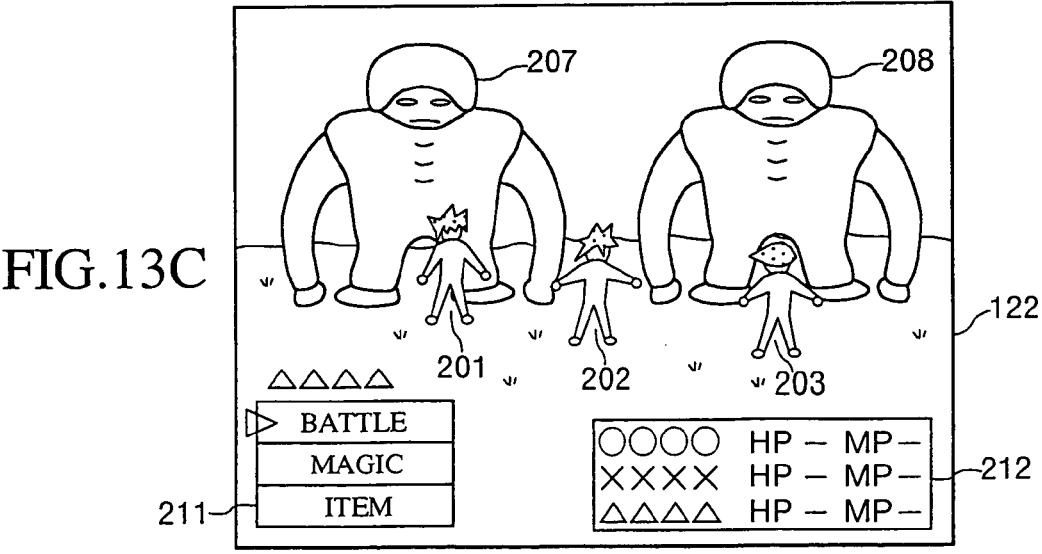

The following will explain the change in the display screen 122 at the battle time in the three-dimensional video game according to this embodiment based on specific examples. The change in the display screen 122 at the battle time occurs when the position of the viewpoint 403 of the virtual camera 401 is moved according to the positions of the characters and the kinds of the characters. FIGS. 13A to 13C are views illustrating examples of the display screen 122 according to the positions of the characters and the kinds of the characters.

FIGS. 13A and 13B illustrate the display screen 122 at the battle of the same time. However, the positions of the player characters 201 to 203 and the enemy characters 204 to 206 change with the progress of the battle. Accordingly, since the position of the viewpoint 403 of the virtual camera 401 is also changed, a change in the display screen 122 appears as in the figure.

In the examples of FIGS. 13A and 13B, the heights of the enemy characters 204 are not much different from those of the player characters 201 to 203. For this reason, since a high score is given to the temporary viewpoint position placed at the higher position, an image in which the position of the viewpoint 403 of the virtual camera 401 is set at a relatively high position is displayed in many cases. In contrast to this, in FIG. 13C illustrating the battle of another time, the heights of the enemy characters 207 and 208 are largely different from those of the player characters 201 to 203 and a high score is given to the temporary viewpoint position placed at a low position. As a result, an image in which the position of the viewpoint 403 of the virtual camera 401 is set at a relatively low position is displayed in many cases.

As explained above, in the three-dimensional video game according to this embodiment, though the position of each character changes with the progress of the battle, the position of the viewpoint 403 of the virtual camera 401 is obtained according to the change in the position of the character. Accordingly, an image perspective-transformed by the virtual camera 401 placed at an appropriate position is displayed on the display screen 122.

The viewpoint 403 of the virtual camera 401 is selected among the temporary viewpoint positions decided as the positions where all characters can be projected on the virtual screen 402. Therefore, all characters participating in the battle are displayed on the display screen 122. Moreover, the visual axis 404 of the virtual camera 401 is always directed to the fixation point 500 which is used to decide the temporary viewpoint position. For this reason, all characters participating in the battle are arranged on the display screen 122 in a well-balanced manner.

The evaluation of each temporary viewpoint position for selecting the position of the viewpoint 403 of the virtual camera 401 is executed using four types of processing, namely, the distance evaluation processing, the angle evaluation processing, the overlap evaluation processing, and the height evaluation processing. In the distance evaluation processing, the shorter the distance from the temporary viewpoint position to the fixation point 500 is, the higher the score is for the temporary viewpoint position. Accordingly, the size of the character displayed on the display screen 122 can be large. In the angle evaluation processing, the smaller the angle $\theta 1$ is, the higher the score is for the temporary viewpoint position. Accordingly, the amount of movement of the viewpoint 403 can be reduced, thereby making it possible to prevent the player from feeing a sense of incompatibility with the change in the display screen 122.

In the overlap evaluation processing, the smaller the character overlapping area is, the higher the score is for the temporary viewpoint position. Accordingly, the player can easily view each character on the display screen 122. Processing for obtaining the character overlapping area in the overlap evaluation process can suppress the amount of processing by use of a simple method. Since the overlapping area obtained here is used to simply decide only the position of the viewpoint 403 of the virtual camera 401, there is no problem in the practical use even if a correct value cannot be obtained by the simple method.

In the height evaluation processing, when the difference in height between the characters is small, the higher the temporary viewpoint position is placed in terms of the angle, the higher the score is for the temporary viewpoint position. When the difference in height between the characters is large, the lower the temporary viewpoint position is placed in terms of the angle, the higher the score is for the temporary viewpoint position. Accordingly, the image can be displayed on the display screen 122 so that the player can easily recognize the size of the character.

On the battle map, the effective range where the position of the viewpoint 403 of the virtual camera 401 can be moved is set, and when the position of the viewpoint 403 exceeds this range, the characters cannot be displayed on the display screen 122 by perspective transformation. In such a case, the position of the viewpoint 403 of the virtual camera 401 is moved to the fixation point 500 and the visual angle 405 is adjusted such that all characters can be projected on the virtual screen 402. Accordingly, the temporary viewpoint position can be set to the position out of the effective range on the battle map to execute the evaluation. Even if the total score of the temporary viewpoint position out of the effective range becomes large, it is possible to generate substantially the same image as the image obtained when the position of the viewpoint 403 of the virtual camera 401 is placed at the temporary viewpoint position out of the effective range.

Though the total scores of the temporary viewpoint positions are calculated by the distance evaluation processing, the angle evaluation processing, the overlap evaluation processing and the height evaluation processing, the temporary viewpoint positions including the four highest scores are selected as positions where the viewpoint 403 of the virtual camera 401 should be moved. The position of the viewpoint 403 of the virtual camera 401 is moved by switching at the selected four temporary viewpoint positions every predetermined time. Accordingly, an image that is rich in a change can be displayed on the display screen 122.

In the three-dimensional video game according to this embodiment, the position of each character at the battle gradually changes. When the battle time becomes long, there is a case that the position of each character is largely different from the position at the battle start time. Even if the battle time becomes long and the position of the character greatly changes, the position of the viewpoint 403 of the virtual camera 401 is newly decided every fixed time. This makes it possible to set the position of the viewpoint 403 of the virtual camera 401 at a suitable position according to the change in the position of the characters at the battle.

The present invention is not limited to the aforementioned embodiment and various modifications and applications may be possible. The following will explain some modifications of the above embodiment that are applicable to the present invention.

According to the aforementioned embodiment, in the angle evaluation processing, at the time of obtaining the score of each temporary viewpoint position, the angle $\theta 1$, which the straight line connecting each temporary viewpoint position to the fixation point 500 formed with the straight line connecting the current position of the viewpoint 403 of the virtual camera 401 to the fixation point 500, was obtained. In the height evaluation processing, the angle $\theta 2$, which the straight line connecting each temporary viewpoint position to the fixation point 500 formed with the horizontal surface, was obtained.

However, $\theta 1$ and $\theta 2$ showing the angle values themselves may not be obtained depending on the computing equation used to obtain the score that evaluates each temporary viewpoint position. Numerical values uniquely defined are obtained in the course of the computation according to angles such as a sine value, a cosine value or a tangent value, so that a final score may be obtained. In this way, obtaining numerical values uniquely defined according to angles such as a sine value, a cosine value or a tangent value is substantially the same as the case in which the angles $\theta 1$ and $\theta 2$ are obtained.

In the aforementioned embodiment, the temporary viewpoint positions having the top 4 scores were selected as the positions of the viewpoint 403 of the virtual camera 401, and the position of the viewpoint 403 was automatically switched between the selected four temporary viewpoint positions every predetermined time. In contrast to this, the position of the viewpoint 403 may be switched such that the time for which the position of the view point 403 is placed increases as the total score of the temporary viewpoint position increases.

Every time when the player inputs a predetermined operation from the input section 161, the control section 103 switches the temporary viewpoint positions having the top four scores sequentially, so that the position of the viewpoint 403 of the virtual camera 401 may be moved. In this case, the player can display his/her favorite image as an image showing the progress of the game on the display device 121 to make it easier to advance the progress of the game.

The player inputs a predetermined operation from the input section 161, so that the control section 103 may move the position of the viewpoint 403 of the virtual camera 401 regardless of the total score. In this case, the viewpoint 403 of the virtual camera 401 may be moved to only the temporary viewpoint position selected with reference to the fixation point 500 (regardless of the value of the total score). The position of the viewpoint 403 may be moved to all positions within the effective range regardless of the temporary viewpoint positions. In this way, the position of the viewpoint 403 of the virtual camera 401 can be freely moved, thereby making it easier for the player to advance the game according to the display screen 122 adjusted to his/her favorite.

In the aforementioned embodiment, every time when the fixed time passed in the battle processing, the total score of each temporary viewpoint position selected with reference to the fixation point 500 was obtained and the position of the viewpoint 403 of the virtual camera 401 was decided. In contrast to this, every time when a character that is newly movable occurs among the player characters 201 to 203, the total score of each temporary viewpoint position selected with reference to the fixation point 500 may be obtained and the position of the viewpoint 403 of the virtual camera 401 may be decided. In this case, the player can provide instructions for action to the movable player characters 201 to 203 after viewing the display screen 122 perspective-transformed from the viewpoint 403 placed at the position suitable for the current state.

In the aforementioned embodiment, the fixation point 500 was set to a central position of all characters (including the player characters and enemy characters) participating in the battle. In contrast to this, when there are variations in the size of the characters and the importance of the battle, weight may be assigned to the position of each character according to the variations to obtain the position of the fixation point 500. This makes it possible to select a suitable position according to the characters participating in the battle as the position of the viewpoint 403 of the virtual camera 401.

There can be considered the character, which does not exert an influence onto the progress of the game even if it is not projected on the display screen 122, such as a character that is in a battle impossible state for a fixed time. Such a character may be excluded when obtaining the fixation point 500. Such a character may be excluded when obtaining the temporary viewpoint positions. This makes it possible to select a suitable position according to the battle state as the position of the viewpoint 403 of the virtual camera 401.

In the aforementioned embodiment, regarding each temporary viewpoint position selected with reference to the fixation point 500, the scores were added thereto in each of the distance evaluation processing, the angle evaluation processing, the overlap evaluation processing and the height evaluation processing, so that the total scores were obtained. However, when at least the distance evaluation processing is applied to calculate the total score of each temporary viewpoint position, it is possible to arbitrarily select whether the angle evaluation processing, the overlap evaluation processing and the height evaluation processing should be applied. The total score of each temporary viewpoint position may be obtained by further adding scores that evaluate each temporary viewpoint position by methods other than the distance evaluation processing, the angle evaluation processing, the overlap evaluation processing and the height evaluation processing.

The aforementioned embodiment explained the case in which the present invention was applied to project the image of the battle between the player characters and the enemy characters. However, the present invention can be applied to the general three-dimensional video games in which multiple characters exist in the virtual three-dimensional space and at least one character moves. The characters are not limited to the aforementioned shapes such as human, animals, robots, and the like, and it is possible to include general objects (for example, automobile, air plane, and the like) that are movable in the virtual three-dimensional space in connection with the progress of the game.

In the aforementioned embodiment, the video game apparatus 100, which was a special-purpose machine, was used as a platform where the three-dimensional video game was executed. In contrast to this, any apparatus such as a general-purpose computer may be used if the apparatus includes the same structural components as those of the video game main body 101. Moreover, a portable video game apparatus, which contains the display device 121 in the same cabinet as that of the video game main body 101, may also be used.

A semiconductor memory card may be used as the storage medium 131 in place of a DVD-ROM or CD-ROM. In the video game apparatus main body 101 or the portable game apparatus, a card slot for inserting the memory card may be formed in place of the DVD/CD-ROM drive 113. In the case of the general-purpose personal computer, the program and data relating to the present invention may be prestored to the HDD 107 instead of being stored to the storage medium 131. Regarding the storage medium for storing the program and data relating to the present invention, any storage medium may be used according to the physical form of hardware and the distribution thereof.

The program for executing the video game of the present invention may be stored on a fixed disc apparatus provided in a Web server apparatus existing on the network 151. The Web server apparatus may convert the program and data stored in the fixed disc apparatus to a signal and superimpose the signal on a carrier wave, and distribute it to the video game main body 101 via the network 151. The program, which the communications interface 115 received from the Web server apparatus, can be stored in the HDD 107 and loaded to the RAM 105 at an executing time.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A three-dimensional video game apparatus that perspective-transforms a virtual three-dimensional space where multiple characters exist onto a virtual screen based upon a virtual camera having a viewpoint position moved in response to positions of the multiple characters, comprising:

a character mover that moves at least one of the characters in the virtual three-dimensional space;

a central position calculator that calculates a central position of the characters in the virtual three-dimensional space;

a temporary point setter that sets multiple temporary points at once in the virtual three dimensional space with reference to the calculated central position;

a temporary viewpoint position setter that sets a temporary viewpoint position on each straight line, connecting each of the temporary points to the central position, where all of the characters can be projected on the virtual screen with a predetermined visual angle;

a distance calculator that calculates a distance between each of the set temporary viewpoint positions and the calculated central position;

a viewpoint position evaluator that evaluates each temporary viewpoint position based on each calculated distance;

a viewpoint position selector that selects a position where the viewpoint of the virtual camera should be moved among the temporary viewpoint positions based on the evaluation result;

a viewpoint position mover that moves the viewpoint position of the virtual camera to the selected position; and a perspective transformer that perspective-transforms the three-dimensional space onto the virtual screen based upon the virtual camera where the viewpoint position is moved:

wherein the temporary points are set around the central position and a direction to each of the temporary points from the central position is predetermined based on polar coordinates of the central position.

2. The three-dimensional video game apparatus according to claim 1, further comprising an angle calculator that calculates an angle formed by a straight line connecting a current viewpoint position of the virtual camera to the calculated central position and each straight line connecting each of the temporary viewpoint positions to the central position, wherein said viewpoint position evaluator further evaluates each temporary viewpoint position based on the calculated angle.

3. The three-dimensional video game apparatus according to claim 1, further comprising an overlap degree calculator that calculates an overlap degree of the characters when the viewpoint of the virtual camera is set to each of the temporary viewpoint positions and perspective transformation is executed, wherein said viewpoint position evaluator further evaluates each temporary viewpoint position based on the calculated overlap degree.

4. The three-dimensional video game apparatus according to claim 3, wherein multiple reference points are assigned to the multiple characters, and said overlap degree calculator calculates the overlap degree of the characters according to an overlapping area of polygons drawn by connecting the reference points projected on the virtual screen in connection with each of the multiple characters.

5. The three-dimensional video game apparatus according to claim 1, further comprising a height difference determiner that determines a height difference between the characters, wherein said viewpoint position evaluator further evaluates each temporary viewpoint position based on the determination result of the height difference.

6. The three-dimensional video game apparatus according to claim 5, wherein said height difference determiner includes a judger that judges whether the height difference between the characters is more than a predetermined value, and said viewpoint position evaluator evaluates each temporary viewpoint position such that the higher the temporary viewpoint position is placed, the more highly the temporary viewpoint position is rated when the height difference between the characters is not more than the predetermined value, the lower the temporary viewpoint position is placed, the more highly the temporary viewpoint position is rated when the height difference between the characters is more than the predetermined value.

7. The three-dimensional video game apparatus according to claim 1, wherein said viewpoint position selector selects multiple viewpoint positions among the temporary viewpoint positions according to the evaluation result, and said viewpoint position mover switches the viewpoint of the virtual camera to the selected viewpoint positions sequentially.

8. The three-dimensional video game apparatus according to claim 7, wherein said viewpoint position mover includes a controller that controls switching of the viewpoint position of the virtual camera every time a predetermined time period passes.

9. The three-dimensional video game apparatus according to claim 7, wherein said viewpoint position mover includes a controller that controls switching of the viewpoint position of the virtual camera according to the evaluation result of the selected multiple positions.

10. The three-dimensional video game apparatus according to claim 7, further comprising a viewpoint switching director that directs switching of the viewpoint position of the virtual camera by a player's operation, wherein said viewpoint position mover includes a controller that controls switching of the viewpoint position of the virtual camera every time switching is directed from said viewpoint switching director.

11. The three-dimensional video game apparatus according to claim 1, wherein a range limit where the viewpoint position of the virtual camera can be moved is fixed in the virtual three-dimensional space, and the three-dimensional video game apparatus further includes a range limit judger that judges whether the selected viewpoint position of the virtual camera is within the range limit, a viewpoint position adjustor that moves the viewpoint position of the virtual camera to a central position within the range limit when the selected viewpoint position of the virtual camera is not within the range limit, and a visual angle adjustor that changes the visual angle of the virtual camera such that all of the characters are projected on the virtual screen.

12. The three-dimensional video game apparatus according to claim 1, further comprising a viewpoint moving director that directs movement of the viewpoint position of the virtual camera by a player's operation, wherein said viewpoint mover moves the viewpoint position of the virtual camera according to the direction of the movement.

13. The three-dimensional video game apparatus according to claim 12, wherein said viewpoint position mover moves the viewpoint position of the virtual camera regardless of whether the viewpoint position is the position selected from the temporary viewpoint positions.

14. The three-dimensional video game apparatus according to claim 1, further comprising a time counter that counts elapse of a fixed time interval, and a starter that starts said central position calculator, said temporary point setter, said distance calculator, and said viewpoint position evaluator every time the fixed time interval elapses.

15. The three-dimensional video game apparatus according to claim 1, wherein the characters include multiple player characters that move in the virtual three-dimensional space by player's instructions, and said three-dimensional video game apparatus further comprises a player character switcher that sequentially switches a player character that can receive a player's instruction and a starter that starts said central position calculator, said temporary point setter, said distance calculator, and said viewpoint position evaluator every time the player character that can receive the player's instruction is switched.

16. The three-dimensional video game apparatus according to claim 1, wherein said central position calculator assigns weight to each of the characters existing in the three-dimensional space to calculate the central position of the multiple characters.

17. The three-dimensional video game apparatus according to claim 1, further comprises a character selector that selects a character to be used to decide the viewpoint position of the virtual camera among the characters existing in the three-dimensional space according to the progress of the game.

18. A three-dimensional video game apparatus that perspective-transforms a virtual three-dimensional space where multiple characters exist onto a virtual screen based upon a virtual camera having a viewpoint position moved in response to positions of the multiple characters, comprising a memory that stores a game program, a processor that executes said game program, and a displayer that displays a processing result of said processor, wherein the game program is stored in said memory and causes said processor to execute:
- moving at least one of the characters in the virtual three-dimensional space;
- calculating a central position of the characters in the virtual three-dimensional space;
- setting multiple temporary points at once in the virtual three-dimensional space with reference to the calculated central position;
- setting a temporary viewpoint position on each straight line, connecting each of the temporary points to the central position, where all of the characters can be projected on the virtual screen with a predetermined visual angle;
- calculating a distance between each of the set temporary viewpoint positions and the calculated central position;
- evaluating each temporary viewpoint position based on each calculated distance;
- selecting a position where the viewpoint of the virtual camera should be moved among the temporary viewpoint positions based on the evaluation result;
- moving the viewpoint position of the virtual camera to the selected position; and
- perspective-transforming the three-dimensional space onto the virtual screen based upon the virtual camera where the viewpoint position is moved:
- wherein the temporary points are set around the central position and a direction to each of the temporary points from the central position is predetermined based on polar coordinates of the central position.

19. The three-dimensional video game apparatus according to claim 18, wherein the game program further calculates an angle formed by a straight line connecting a current viewpoint position of the virtual camera to the calculated central position and each straight line connecting each of the temporary viewpoint positions to the central position, and each temporary viewpoint position is further evaluated based on the calculated angle.

20. The three-dimensional video game apparatus according to claim 19, wherein the game program further calculates an overlap degree of the characters when the viewpoint of the virtual camera is set to each of the temporary viewpoint positions and perspective transformation is executed, and each temporary viewpoint position is further evaluated based on the calculated overlap degree.

21. The three-dimensional video game apparatus according to claim 18, wherein the game program further determines a height difference between the characters, and each temporary viewpoint position is further evaluated based on a determination result of the height difference.

22. A computer-implemented method for controlling a viewpoint position of a virtual camera based on positions of multiple characters existing in a virtual three dimensional space in a three-dimensional video game that perspective-transforms the virtual three-dimensional space onto a virtual screen based upon the virtual camera, comprising:
- moving, with a computer, at least one of the characters in the virtual three-dimensional space;
- calculating, with the computer, a central position of the characters in the virtual three dimensional space;
- setting, with the computer, multiple temporary points at once in the virtual three dimensional space with reference to the calculated central position;
- setting, with the computer, a temporary viewpoint position on each straight line, connecting each of the temporary points to the central position, where all of the characters can be projected on the virtual screen with a predetermined visual angle;
- calculating, with the computer, a distance between each of the set temporary viewpoint positions and the calculated central position;
- evaluating, with the computer, each temporary viewpoint position based on each calculated distance;
- selecting, with the computer, a position where the viewpoint of the virtual camera should be moved among the temporary viewpoint positions based on the evaluation result;
- moving, with the computer, the viewpoint position of the virtual camera to the selected position; and
- perspective-transforming, with the computer, the three-dimensional space onto the virtual screen based upon the virtual camera where the viewpoint position is moved:
- wherein the temporary points are set around the central position and a direction to each of the temporary points from the central position is predetermined based on polar coordinates of the central position.

23. The method according to claim 22, wherein an angle formed by a straight line connecting a current viewpoint position of the virtual camera to the calculated central position and each straight line connecting each of the temporary viewpoint positions to the central position is further calculated, and each temporary viewpoint position is further evaluated based on the calculated angle.

24. The method according to claim 22, wherein an overlap degree of the characters is further calculated when the viewpoint of the virtual camera is set to each of the temporary viewpoint positions and perspective transformation is executed, and each temporary viewpoint position is further evaluated based on the calculated overlap degree.

25. The method according to claim 22, wherein a height difference between the characters is further determined, and each temporary viewpoint position is further evaluated based on a determination result of the height difference.

26. A non-transitory computer-readable storage medium on which a game program for executing a video game that perspective-transforms a virtual three-dimensional space where multiple characters exist onto a virtual screen based upon a virtual camera having a viewpoint position moved in response to positions of the multiple characters, the game program causing a computer apparatus to execute:
- moving at least one of the characters in the virtual three-dimensional space;

calculating a central position of the characters in the virtual three-dimensional space;

setting multiple temporary points at once in the virtual three-dimensional space with reference to the calculated central position;

setting a temporary viewpoint position on each straight line, connecting each of the temporary points to the central position, where all of the characters can be projected on the virtual screen with a predetermined visual angle;

calculating a distance between each of the set temporary viewpoint positions and the calculated central position;

evaluating each temporary viewpoint position based on each calculated distance;

selecting a position where the viewpoint of the virtual camera should be moved among the temporary viewpoint positions based on the evaluation result;

moving the viewpoint position of the virtual camera to the selected position; and perspective-transforming the three-dimensional space onto the virtual screen based upon the virtual camera where the viewpoint position is moved, wherein the temporary points are set around the central position and a direction to each of the temporary points from the central position is predetermined based on polar coordinates of the central position.

* * * * *